United States Patent [19]

Aoyagi et al.

[11] Patent Number: 5,959,571
[45] Date of Patent: Sep. 28, 1999

[54] RADAR DEVICE

[75] Inventors: Yasushi Aoyagi, Yokohama; Toshihide Fukuchi, Hiratsuka; Kiyoshi Inoue, Atsugi; Ryuji Kohno, Yokohama, all of Japan

[73] Assignee: The Furukawa Electric Co., Ltd., Tokyo, Japan

[21] Appl. No.: 08/981,054

[22] PCT Filed: Apr. 22, 1997

[86] PCT No.: PCT/JP97/10372

§ 371 Date: Dec. 11, 1997

§ 102(e) Date: Dec. 11, 1997

[87] PCT Pub. No.: WO97/40400

PCT Pub. Date: Oct. 30, 1997

[30] Foreign Application Priority Data

| Apr. 22, 1996 | [JP] | Japan | 8-100391 |
| May 17, 1996 | [JP] | Japan | 8-123577 |
| Jul. 24, 1996 | [JP] | Japan | 8-194792 |

[51] Int. Cl.$^6$ .................................................. G01S 13/93
[52] U.S. Cl. .............................. 342/70; 342/145; 342/146
[58] Field of Search ............................... 342/70, 71, 72, 342/99, 101, 145, 146, 195

[56] References Cited

U.S. PATENT DOCUMENTS 4,219,812  8/1980  Rittenbach ............................... 342/195
5,731,781  3/1998  Reed ....................................... 342/135

FOREIGN PATENT DOCUMENTS

| 3-160384 | 7/1991 | Japan. |
| 3-206988 | 9/1991 | Japan. |
| 5-87914 | 4/1993 | Japan. |
| 6-242230 | 9/1994 | Japan. |
| 7-271514 | 10/1995 | Japan. |
| 8-278362 | 10/1996 | Japan. |
| 8-327731 | 12/1996 | Japan. |

Primary Examiner—John B. Sotomayor
Attorney, Agent, or Firm—Frishauf, Holtz, Goodman, Langer & Chick, P.C.

[57] ABSTRACT

A radar device transmits an electric wave whose band is spread by a PN code, receives a reflected wave of the electric wave from an object 10, detects correlation between a received signal and a PN code which is delayed, and thereby detects the object. A receiving part 18 connects three receiving antennas 16a~16c sequentially one by one, thereby to receive a reflected wave from an object. The three receiving antennas are arranged having their directions so staggered that their antenna beam patterns partly overlap with each other. A correlation detection circuit 19 detects such a slide width that a value of correlation between a received signal received by each of the antennas and the PN code exceeds a predetermined threshold. An operation part 12 obtains an azimuth of an object based on the detected slide width and beam pattern characteristics of the antennas.

12 Claims, 24 Drawing Sheets

F I G. 6
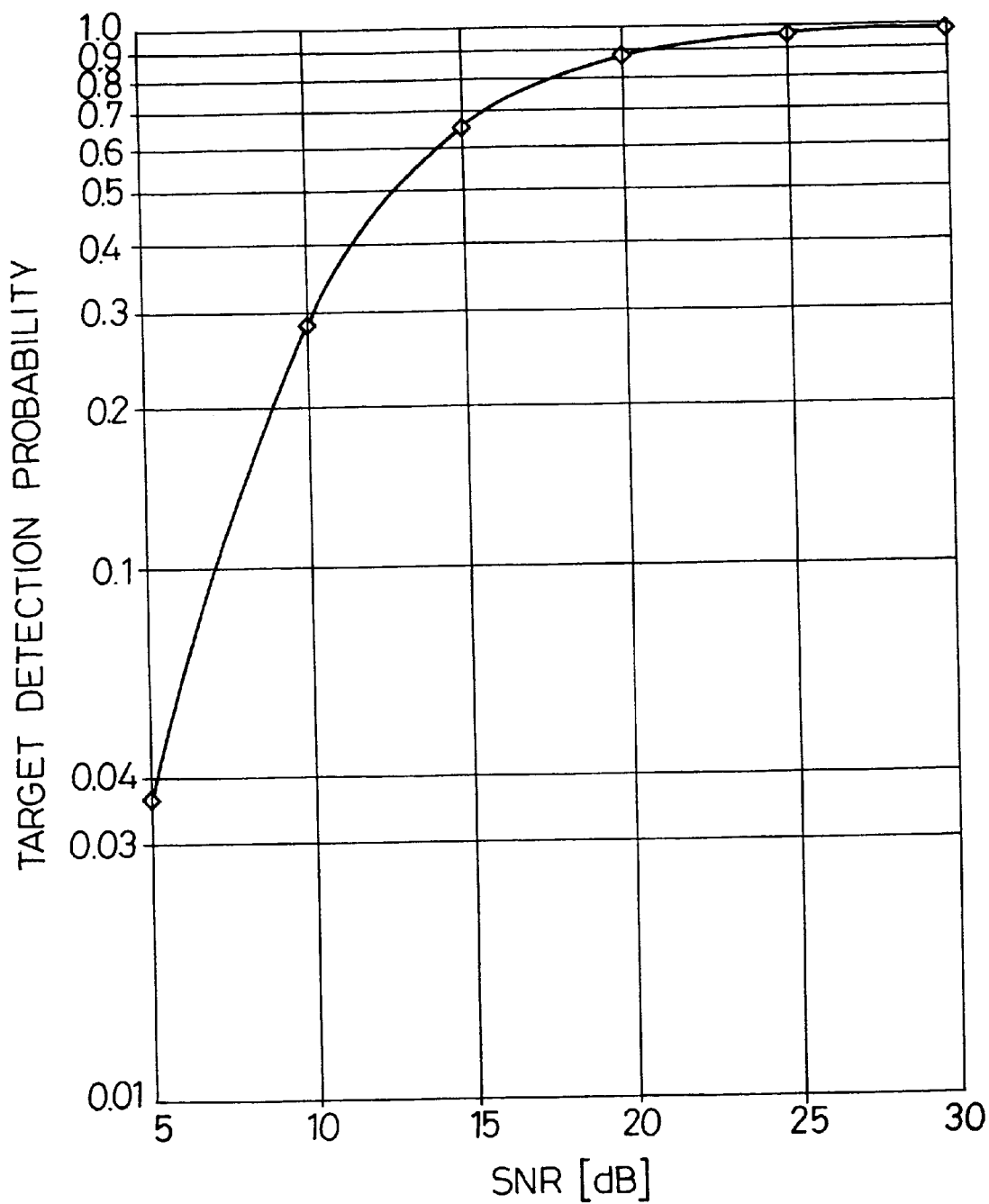

F I G. 17
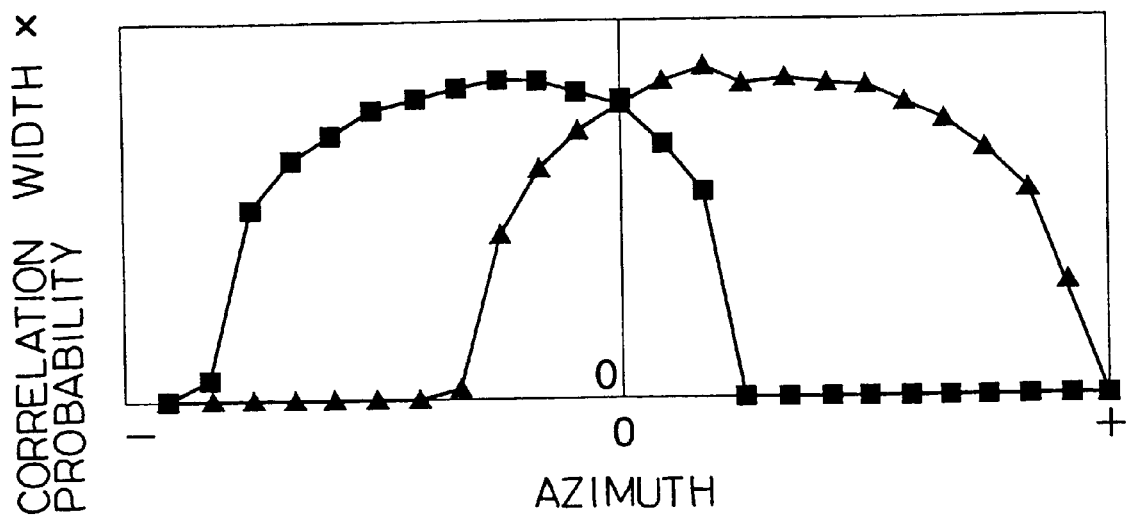
F I G. 18
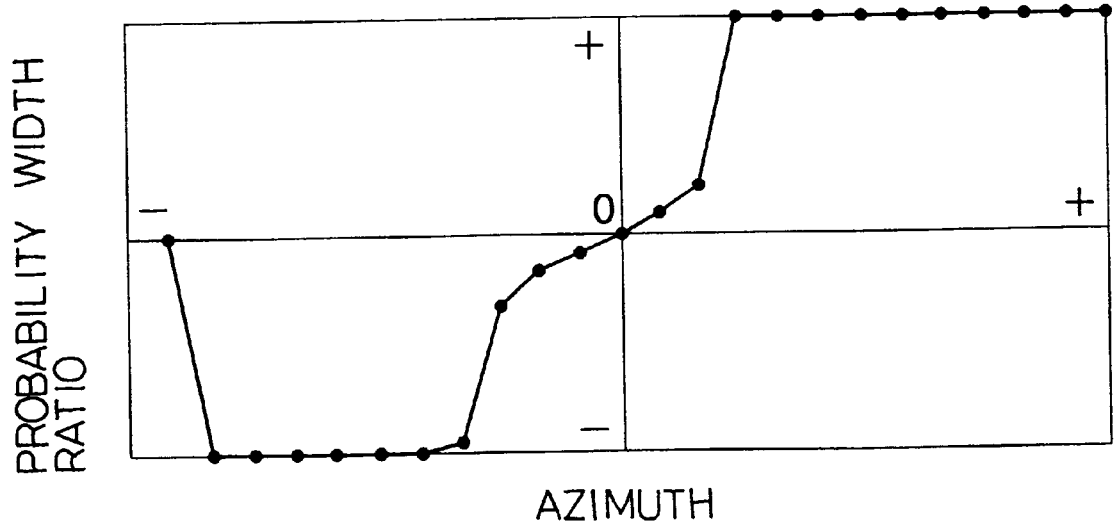

F I G. 24
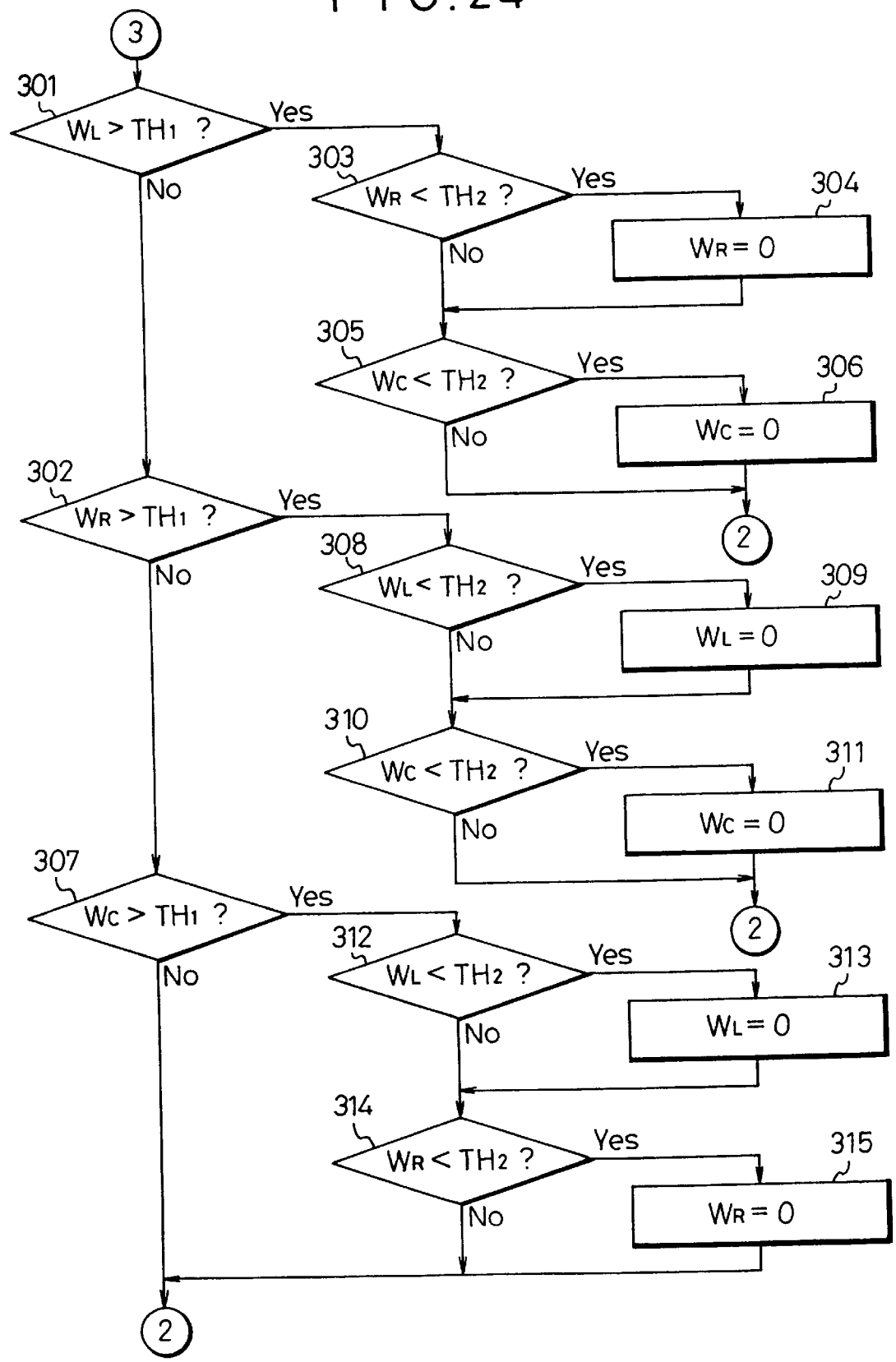

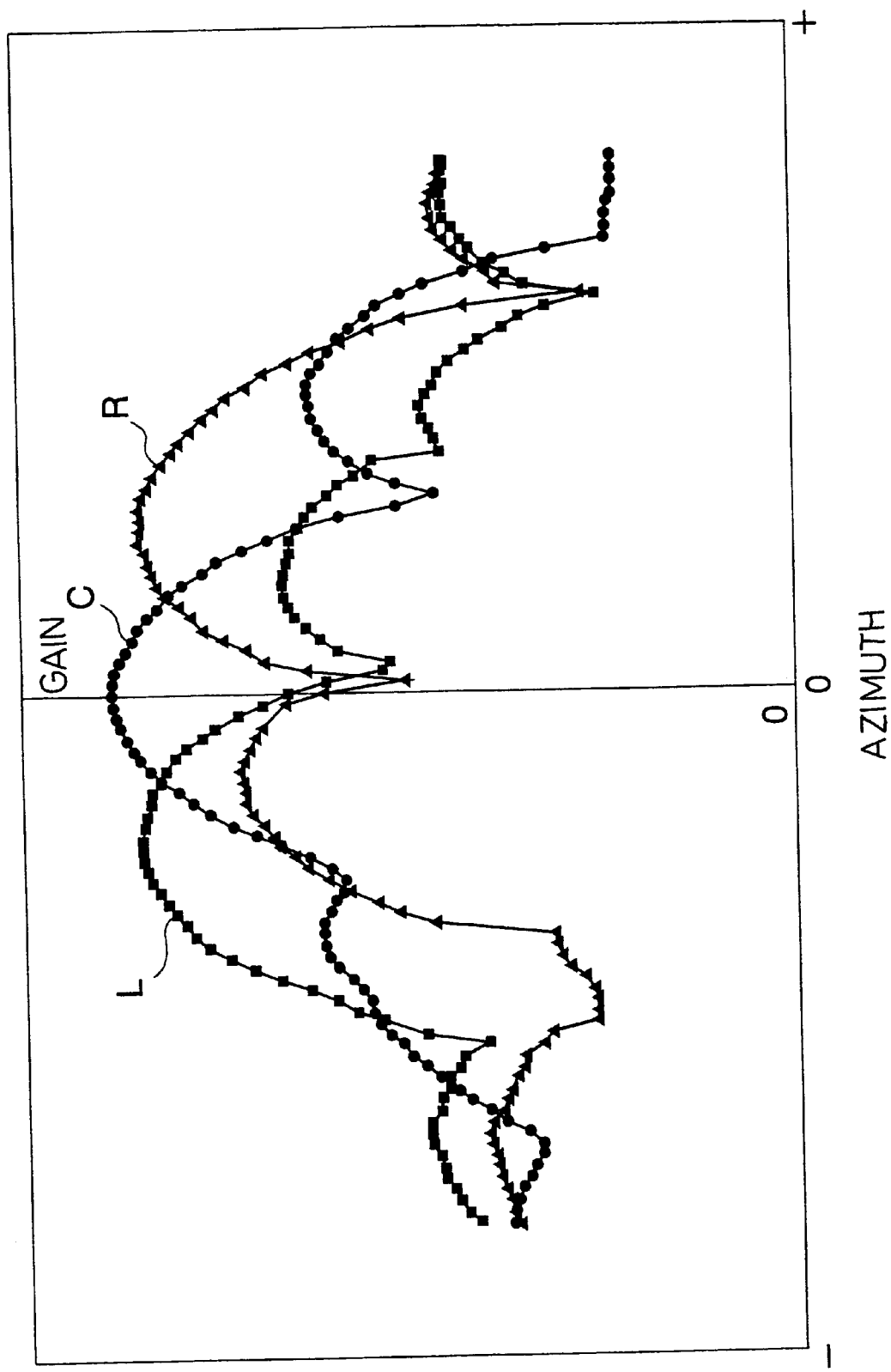

RADAR DEVICE

TECHNICAL FIELD

The present invention relates to a radar device which receives a reflected wave of a transmitted wave, reflected from an object, thereby measuring a relative speed, a distance and an azimuth of an object, and particularly to a radar device for use in a vehicle.

BACKGROUND ART

As a radar device of the aforementioned kind, there is conventionally known a device as shown, for example, in Japanese Patent Application No. Hei 7-271514 (filed Oct. 19, 1995, published as Japanese Patent Preliminary Publication No. Hei 8-278362), which obtains, utilizing the spread spectrum modulation technique, correlation between a received signal from an object and a pseudonoise signal (hereunder referred to as "PN code") consisting of a sequence of pseudonoise codes, and detects an object and measures a relative speed thereof and a distance thereto, utilizing a peak value of that correlation. However, measurement of an azimuth of an object is not referred to in this kind of radar device.

As a radar device which performs measurement of an azimuth of an object, there is known, for example, a device using a beam switching system, which arranges a plurality of receiving antennas having a narrow beamwidth, capable of determining an azimuth easily and having a differently oriented beam from each other, and connects those receiving antennas sequentially one by one. There is also known a radar device, for example, using a mechanical system, which swings a single receiving antenna mechanically, thereby to change the direction of a beam. Further, there is known, for example, a radar device using a electronic system, which uses a phased array antenna and changes the direction of a beam electronically. In conventional radar devices, an azimuth of an object is measured utilizing the above mentioned systems to receive a reflected wave from an object.

The case in which a radar device performing azimuth measurement is used, for example, as a radar device installed in a vehicle will be explained hereunder. First, explanation will be given of an example of a radar device using a beam switching system, where the range of azimuth measurement is determined to be, for example, about 10[deg]. If an azimuth of an object is to be detected, for example, for each 1[deg] of this range of measurement, it is necessary to arrange planar antennas having a beamwidth of 1[deg] at positions shifted by each 1[deg], in order to determine an azimuth of an object uniquely. Therefore, ten antennas are needed in all.

Generally, there lies the following relation between directivity and dimension of an antenna:

$$\Theta = k(\lambda/D) \quad (1)$$

where $\Theta$: half power beamwidth of an antenna k: half power beamwidth coefficient which is determined depending on a feeding method $\lambda$: used wavelength D: horizontal array length of an antenna.

As is clear from the above, directivity of an antenna is inversely proportional to the dimension of an antenna, if the same frequency and the same feeding method are used. When a planar array antenna as described above is used and the half power beamwidth coefficient k and used frequency are, for example, 50.8° and 60.5 [GH$_z$] (wavelength $\lambda$=0.004955[m]), respectively, the expression (1) is as follows:

$$1 = 50.8(0.004955/D)$$

$$D \div 0.252 \, [m].$$

Thus, in this case, ten of planar array antennas of about 25[cm] in each side are needed as receiving antennas.

As described above, a radar device using a beam switching system needs to arrange many antennas when a wide range of azimuth measurement is desired. Therefore, a radar device using a beam switching system is not suited to be installed in a vehicle which has only limited space for installation, and the range of application of this kind of radar device is limited. A radar device using any of the other systems mentioned above is not suited to be installed in a vehicle, if it likewise needs to arrange many antennas.

In addition, a radar device using a mechanical system as mentioned above needs a motor, an actuator and their power supply in order to swing an antenna. Thus, a radar device of this kind takes a long time to change an antenna, and takes high manufacturing cost in order to ensure reliability in precision of its mechanical parts. On the other hand, a radar device using an electronic system as mentioned above needs a phase controller for each antenna element, which controls an electric wave so that it may have a phase calculated according to a predetermined operation, and thereby controls directivity. However, a phase controller for a band of micro wave or millimeter wave, which is the band used by a vehicle, is expensive, so that a radar device using an electronic system is not suitable for a vehicle.

As a system for use in a radar device for measuring an azimuth, of which high reliability in precision and reduction of cost are expected, there are known a sequential lobing system and a monopulse system. These are the systems utilizing signals from a plurality of antennas whose beams are different in direction from each other. As shown in FIG. 25, antennas 3, 4 used in these systems are so arranged that patterns of their beams 1, 2 partly overlap with each other, so that values of received strengths relative to the same object by the respective beams can be compared with each other.

For example, when an object (target) 10 exists within an area where the two beams 1, 2 overlap each other, a radar device needs to have received powers of reflected waves from the object which are detected by the respective beams, in order to obtain an azimuth of the object. Received power by each beam is determined depending upon a radar cross section of an object which falls within a detection range of each beam and a beam pattern of each beam. Therefore, conventional devices calculate a ratio of received powers (hereunder referred to as "power ratio"), compares the calculated power ratio with antenna beam patterns, and thereby obtains an azimuth of an object.

When there is a disturbance in an electric wave due to low received power, an influence of noises or so forth, a radar device may fail to detect a reflected wave though an object exists within its range of measurement, so that the object may be missed. Such phenoma will be hereunder referred to as "omissions". In order to deal with this problem, in conventional radar devices, a tracking part is provided to accumulate instantaneous results of measurement for a predetermined number of times, thereby to supplement measured values corresponding to "omissions" produced in measurement.

However, in the sequential lobing system and the monopulse system, measurement of received power is needed. Therefore, radar devices using those systems need to have an automatic gain controller (AGC), an IQ demodulator, an A/D converter, a sampling circuit and so forth, so that they have the disadvantage of large circuit formation.

Further, the monopulse system has a problem that it needs complicated circuit formation as compared with the sequential lobing system, since it performs processing of signals such as RF signals basically in the manner of parallel processing.

Furthermore, both of the above systems have a problem that "omissions" have a large influence on measurement of an azimuth, so that sufficient supplement relative to "omissions" may not be performed.

Furthermore, in a transmit-receive composite directional characteristic of an actual multibeam antenna, a beam pattern shows a rise in gain called "main lobe" which forms a central part of a beam pattern, and a rise in gain called aside lobes which is produced on each side of a main lobe (See three beams L, C, R of a multibeam antenna shown in FIG. 26). A side lobe is a problem since it distorts power ratio of beams, and any of the above mentioned systems needs to consider this problem. In measurement of an azimuth, it is desirable that all the side lobes, i.e., the lobes excepting a main lobe are compressed to a very low level.

In an actual beam pattern, side lobes are necessarily produced and cause such a problem, when a azimuth is to be obtained from a power ratio, that an area capable of azimuth judgment is narrowed due to the influence of side lobes, or that a plurality of azimuths correspond to a single power ratio so that a correct azimuth is difficult to judge.

Further, for example, in conventional systems, an index of reliability in azimuth Judgment is formed based on an absolute value corresponding to a power. A power ratio relative to a given target, based on which an azimuth is obtained, momentarily varies largely, so that smooth processing is needed. For smooth processing, for example, if an average is taken for a plurality of times of power measurement, such may happen that the average obtained in the case in which large power has been only once accidentally measured due to an influence of noise or so agrees with the average obtained in the case in which power close to the average has been measured a plurality of times. The former case is a problem, since it does not provide an appropriate evaluation of power, so that it leads to a false judgment of an azimuth.

Further, conventional systems have such a problem that when an object is at a large distance or when it is small, the area where an azimuth measurement based on a power ratio relies on only one beam is increased, so that resolution in azimuth measurement is lowered.

DISCLOSURE OF THE INVENTION

The present invention has been made in view of the above problems, and one object of the present invention is to provide a radar device capable of measuring an azimuth of an object which needs only small space for installation and has a simple and not costly structure.

Another object of the present invention is to measure an azimuth of an object, supplementing omission of data with simple and highly reliable structure.

A further object of the present invention is to reduce an influence of side lobes of a directional pattern of an antenna.

Those above objects have been attained by the radar device of the present invention. The radar device of the present invention transmits, from its transmitting side, an electric wave whose band is spread by modulation using a PN code, receives on its receiving side a reflected wave of the electric wave from an object, and thereby detects that object. The radar device of the present invention arranges a plurality of receiving antennas in the manner that antenna beam patterns of the antennas are adjacent to each other, partly overlapping with each other, judges that an object is detected when a value of correlation between a received signal received by each of the antennas and a PN code whose output is delayed exceeds a predetermined threshold, and shifts a delay time of the PN code by a unit smaller than one chip length before and after a peak of the correlation between the received signal and the PN code which is delayed. A correlation detection part outputs the maximum range of such shifting which is performed while a value of correlation continuously exceeds a predetermined threshold, as a "slide width". An operation part obtains an azimuth of an object, based on that measured slide width and beam pattern characteristics of the antennas.

According to another mode, the radar device of the present invention arranges a plurality of receiving antennas each having an antenna beam pattern having a predetermined directivity in the manner that the antenna beam patterns of the antennas are adjacent to each other, partly overlapping with each other. A tracking part measures a frequency of how often an object is detected by each of the antennas, and a probability calculation circuit calculates a detection probability of that object based on that measured frequency. It is desirable that a probability/azimuth reference part obtains in advance relation between probability and azimuth based on the beam pattern characteristics of the antennas, and obtains an azimuth of the object based on the calculated detection probability and the relation between probability and azimuth. Thus, in this mode of the radar device of the present invention, the probability calculation circuit calculates a probability that an object is detected by each of the antennas while measurement is performed at predetermined times is obtained through track processing by the tracking part, and the probability/azimuth reference part obtains an azimuth of the object utilizing thus obtained probability.

According to another mode of the radar device of the present invention, a measurement part measures an strength (voltage) of a received signal from an object, received by each of the antennas. It is desirable that a probability/azimuth reference part obtains a probability strength ratio (probability voltage ratio) of beams, based on a detection probability and the measured strength, obtains in advance relation between strength ratio and azimuth based on beam pattern characteristics of the antennas, and obtains an azimuth of the object based on thus obtained probability strength ratio and the relation between strength ratio and azimuth.

According to another mode, it is desirable to provide at least three antennas. A probability/azimuth reference part stores in advance a conversion function for obtaining a corresponding azimuth from an strength ratio of adjacent beams. The probability/azimuth reference part compares values of probability strength by the respective beams, which are obtained based on measurement, with each other, thereby to judge whether an object is detected by a side lobe of each beam or detected by a main lobe of each beam or detected due to false tracking by a tracking part. It is desirable that the probability/azimuth reference part calculates a probability strength ratio based on such values of probability strength of received signals that are judged to be detected by main lobes of beams, and obtains an azimuth of the object utilizing the stored conversion function based on the calculated probability strength ratio, thereby reducing an influence of side lobes.

The probability/azimuth reference part judges whether an object is detected by a side lobe of each beam or detected by a main lobe of each beam, by judging whether values of strength of received signals by adjacent beams show a physical contradiction of measurement which can not occur in measurement by a main lobe, for example by judging whether each of the values of strength measured by the right and left beams is larger than the value of strength measured by the center beam. When a value of strength shows the contradiction, the probability/azimuth reference part judges that that value is detected by a side lobe and eliminates that value from calculation for obtaining the probability strength ratio. It is desirable that values of strength do not show the contradiction, the probability/azimuth reference part judges whether the values of strength of the received signals are saturated or not, and eliminates a value of strength of a received signal which is not judged to be saturated, from calculation for obtaining the probability strength ratio. The tracking part relates the current data of measurement with the previous result of tracking. When results of detection by the respective beams are integrated in order to calculate an strength probability ratio based on which an azimuth is obtained, if there exist a plurality of vehicles, false integration (tracking) may happen. However, such false tracking can be detected and corrected by the above mentioned judgment of contradiction.

It is desirable that the probability/azimuth reference part judges that there is a physical contradiction of measurement, when both beams which are adjacent to a reference beam on both sides show a value of probability strength larger than the value of probability strength by the reference beam.

BRIEF DESCRIPTION OF THE DRAWINGS

FIG. 6 is a relational diagram showing an example of relation between SNR and detection probability which is obtained based on a certain false detection probability;

FIG. 17 is a relational diagram showing relation between azimuth and probability width of each beam in a third embodiment;

FIG. 18 is another relational diagram showing relation between azimuth and probability width ratio;

FIG. 24 is another part of flow chart for explaining the above mentioned algorithm;

FIG. 26 is a characteristic diagram showing a transmit-receive composite characteristic of a multibeam antenna.

BEST MODE OF CARRYING OUT THE INVENTION

A radar device according to the present invention will be explained based on FIGS. 1 to 24.

Figure 1:
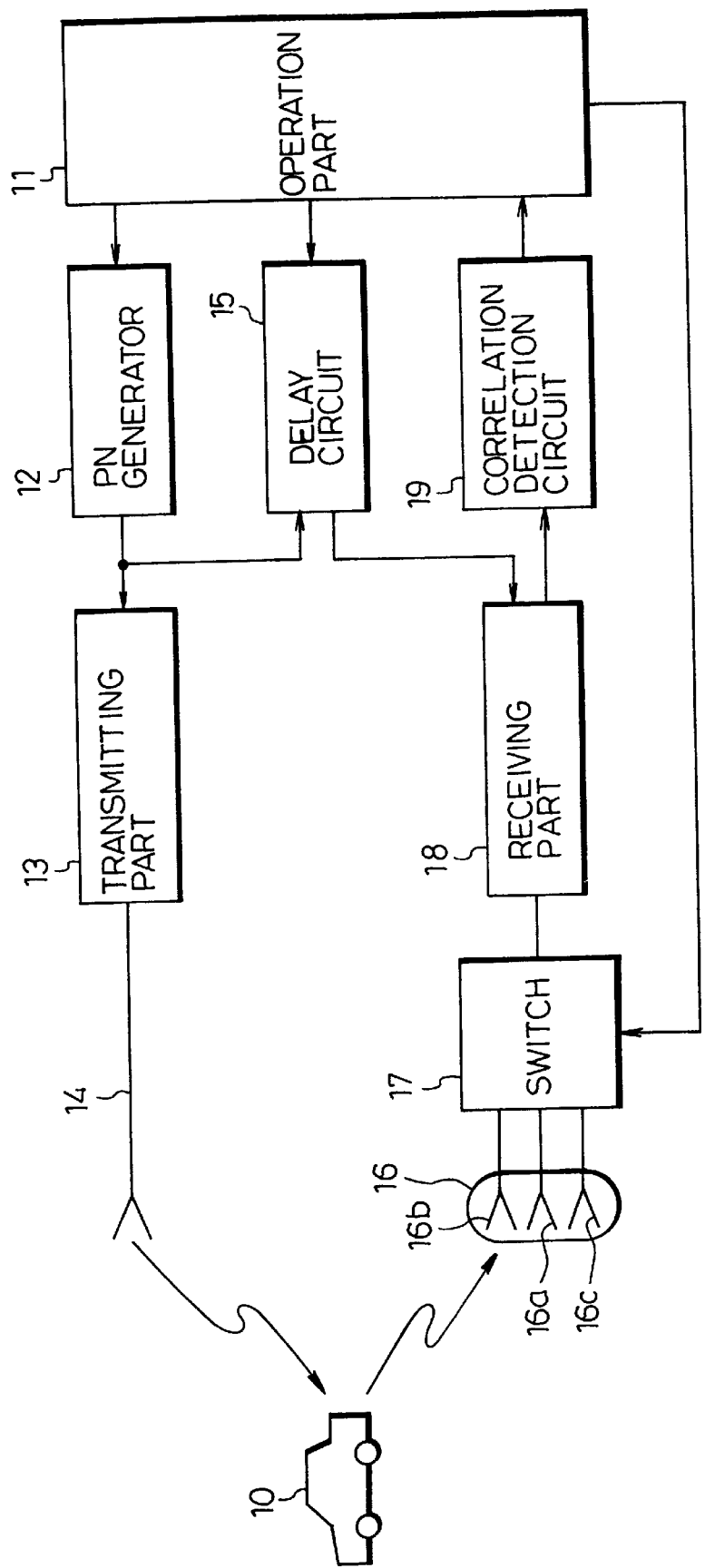
FIG. 1 is a block diagram showing formation of a first embodiment of a radar device according to the present invention.

FIG. 1 is a block diagram showing formation of a first embodiment of a radar device according to the present invention. As shown in FIG. 1, a radar device according to a first embodiment comprises an operation part 11, a PN generator 12, a transmitting part 13, a transmitting antenna 14, a delay circuit 15, a receiving antenna unit 16, a switch 17, a receiving part 18 and a correlation detection circuit 19.

The operation part 11 performs a variety of controls and operations on inputted signals. The PN generator 12 is connected with the operation part 11 and outputs, under the control of the operation part 11, a random PN code having a predetermined length (period) to the transmitting part 13 and the delay circuit 15. The transmitting part 13 transmits an electric wave whose band is spread by direct spread modulation. Specifically, in the transmitting part 13, a high frequency signal whose band is broadly spread by the inputted PN code is generated, and that high frequency signal is transmitted through the transmitting antenna 14 as an electric wave. The signal generated in the transmitting part 13 is, for example, in the case in which the radar device of the present embodiment is used in a general vehicle, a millimeter wave signal having a frequency optimum for a radar device, for example, a high frequency signal of 60 GHz or 76 GHz.

The delay circuit 15 is connected with the operation part 11 and the PN generator 12. The delay circuit 15 delays, under the control of the operation part 11, the PN signal inputted from the PN generator 12 for a predetermined time and outputs it to the receiving part 17.

The transmitted electric wave reaches an object 10 at some distance and is reflected by the object 10. The reflected electric wave is, through receiving antennas of the receiving antenna unit 16 and the switch 17, received by the receiving part 18 as a received signal.

Figure 2:
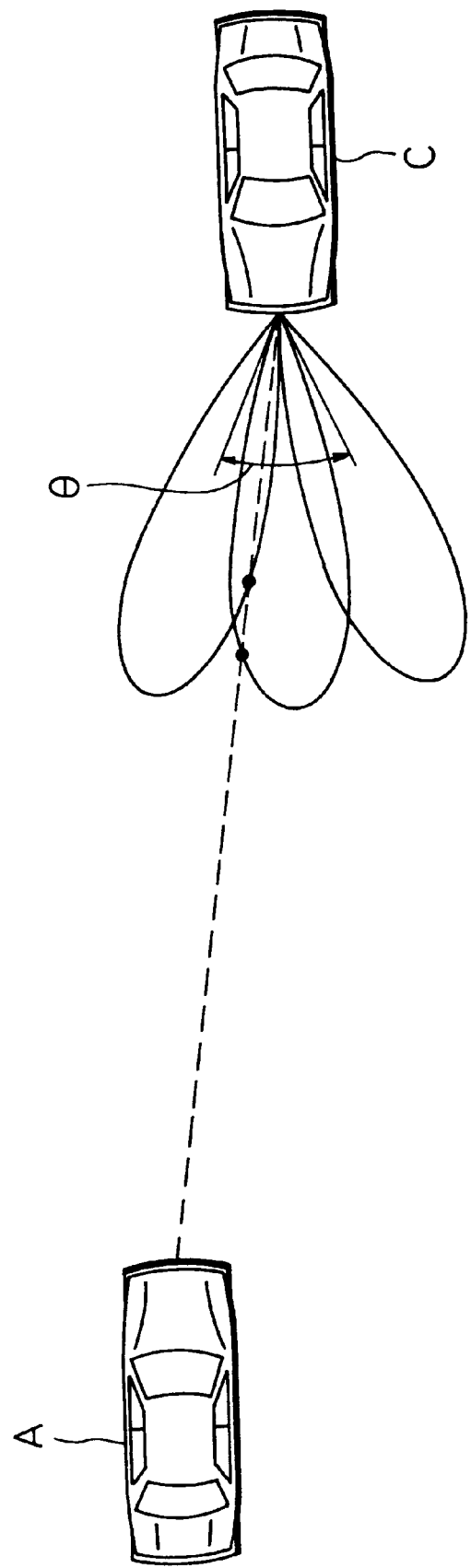
FIG. 2 is a diagram for explaining operation of a radar device of a first embodiment installed in a vehicle.

In the present embodiment, the receiving antenna unit 16 comprises three receiving antennas 16a~16c each having a known antenna beam pattern. As shown in FIG. 2, in the case in which the radar device according to the present invention is installed in a vehicle C, the receiving antennas are arranged having their directions so staggered that the antenna beam patterns of the receiving antennas may partly overlap with each other. Specifically, in the present embodiment, the receiving antennas 16a~16c are so arranged that part of beam pattern of each of the receiving antennas 16b and 16c may overlap a beam pattern of the receiving antenna 16a. Further, in the present embodiment, the directions of the receiving antennas are so staggered that the beam patterns of the receiving antennas 16b and 16c may not overlap with each other but be partly adjacent to each other.

In a general receiving antenna, the size of an antenna beam pattern varies depending on the direction in which detection is performed. Therefore, it is known that when a receiving antenna of that kind is used in a radar device and target objects which are at the same distance but in different directions are detected thereby, received powers are different depending upon directions in which reflected waves come.

Considering the above, the present embodiment is so provided as to perform an azimuth measurement of an object existing within an azimuth measurement range θ, in which range objects in front can be detected, by two receiving antennas in the receiving antenna unit 16 (either the antennas 16a and 16b or the antennas 16a and 16c) (See FIG. 2).

In the present embodiment, the receiving antennas 16a~16c are, sequentially one by one, connected with the receiving part 18 by changing the switch 17 sequentially. Thus, in the present embodiment, a reflected wave from an object (a vehicle A in the case of FIG. 2) is received by the receiving antennas 16a~16c sequentially.

Based on this switching, received signals received by the receiving antennas are sequentially inputted to the receiving part 18. The switch 17 performs the switching of the receiving antennas under the operation control of the operation part 11. The timing interval with which the operation part 11 changes the switch 17 is determined based on signal processing performance of the receiving part 18, the correlation detection circuit 19 and the operation part 11.

The receiving part 18 despreads the received signal with the PN code from the delayed circuit 15 to obtain correlation. When the correlation is obtained, the receiving part 18 outputs a signal having a sharp peak in the intermediate frequency band.

The correlation detection circuit 19 converts the signal of the intermediate frequency band inputted from the receiving part 18, to a signal of the low frequency through a certain stages by a plurality of mixers (not shown), and then checks up on the correlation. Specifically, for the correlation detection circuit 19, a threshold S for a correlation value is predetermined, as shown in the correlation characteristics in FIGS. 3A and 3B. When the signal inputted from the receiving part 18 (a correlation value) exceeds the threshold S, the correlation detection circuit 19 outputs a correlation detection signal to the operation part 11.

Figure 3A:
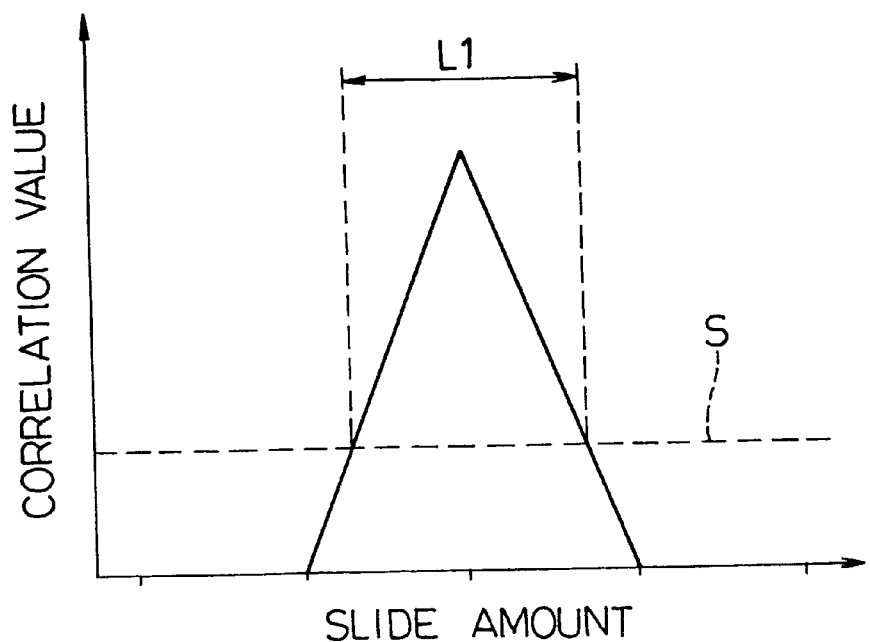
FIG. 3A is a characteristic diagram showing a correlation characteristic between a correlation value and a phase slide amount of a PN code.
Figure 3B:
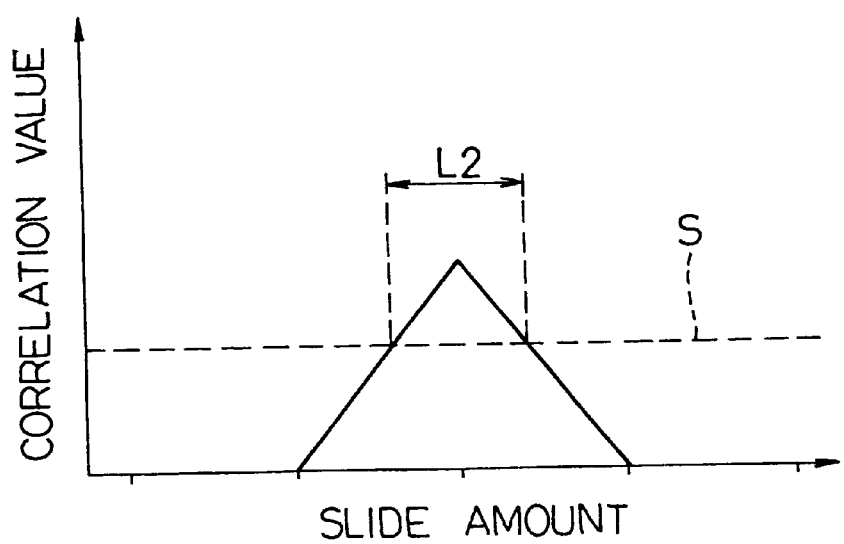
FIG. 3B is a characteristic diagram showing a correlation characteristic between a correlation value and a phase slide amount of a PN code, similar to FIG. 3A.

The correlation value varies depending on the strength of received power received by the receiving antenna. For example, when the received power is of high strength, the correlation value (peak value) is large, and the width of correlation (phase slide range of the PN code in which the correlation value exceeding the threshold S can be detected) L1 is large as shown in FIG. 3A. When the received power is of low strength, the correlation value is small, and the width of correlation L2 is small as shown in FIG. 3B. Thus, the correlation detection circuit 19 detects the slide width L1 as shown in FIG. 3A when the received power is of high strength, detects the slide width L2 as shown in FIG. 3B when the received power is of low strength, and outputs the correlation detection signal to the operation part 11.

From the correlation detection signal inputted from the correlation detection circuit 19, the operation part 11 recognizes that the correlation is obtained, and detects the existence of an object. At the time when the correlation begins to be obtained by shifting the delay time, the correlation detection signal is still unstable, that is, it is outputted and vanishes, unstably. Therefore, the operation part 11 measures the correlation detection signals for some periods, and when it is ascertained that the correlation signals can be counted stably, the operation part 11 Judges that the correlation is obtained.

The operation part 11 controls the output of the PN code from the delay circuit 15 to delay the output for a predetermined time, so that the correlation between the received signal and the PN code may be obtained. In the present embodiment, the operation part 11 determines a delay time a little coarsely in the early time of its control. Then, when the correlation between the received signal and the PN code begins to be obtained, that is, when the correlation detection signal from the correlation detection circuit 19 begins to rise and exceeds the threshold S, the operation part 11 determines the delay time finely. That is, the operation part 11 controls the output of the PN code from the delay circuit 15 to delay the output for a predetermined time, in the manner that the phase of the PN code is shifted by a unit smaller than one chip length before and after a peak of the detected correlation.

In the radar device of the present embodiment, the ratio of the gains of two of the receiving antennas (the antennas 16a and 16b or the antennas 16a and 16c) according to the azimuth (beam pattern characteristic) is obtained in advance, and the obtained data is stored in the operation part 11 in the form related to the ratio of the slide widths of the two receiving antennas. The beam pattern characteristic corresponds to the ratio of the received powers received by the two receiving antennas, and the ratio of the received powers corresponds to the ratio of the slide widths according to the azimuth. Therefore, the beam pattern characteristic and the ratio of the slide widths are relative to each other, so that they can be related to each other.

In the case of FIG. 2, the correlation is obtained between the received signal of the antenna 16a of the three receiving antennas and the PN code and between the received signal of the antenna 16b and the PN code. Therefore, the operation part 11 counts the slide width in which the correlation value for the received signal from the antenna 16a exceeds the threshold S and the slide width in which the correlation value for the received signal from the antenna 16b exceeds the threshold S, and obtains the maximum values of those respective slide widths. In the case of FIG. 2 in which the reflected wave from the vehicle A is received, the received power by the receiving antenna 16a is larger than the received power by the receiving antenna 16b. Thus, for example, the correlation value on the side of the antenna 16a is such as shown in FIG. 3A, while the correlation value on the side of the antenna 16b is such as shown in FIG. 3B.

The operation part 11 compares the ratio of those maximum values of slide width counted for the respective antennas with the beam pattern characteristic stored in itself, thereby to obtain the azimuth of the detected object (vehicle A).

The operation part 11 obtains, as distance information, for example, the delay time up to the middle point between the point of time when the correlation detection signal from the correlation detection circuit 19 begins to rise and the point of time when it begins to vanish (the delay time up to the point of time where the correlation shows a peak value, as shown in FIGS. 3A and 3B). The operation part 11 measures the distance to the object relative to which the correlation is obtained, based on that distance information. The operation part 11 further obtains the Doppler shift amount and the Doppler shift direction of the measured frequency of the correlation detection signal relative to the predetermined center frequency of the correlation detection signal, thereby to detect the traveling direction and the relative speed of the object.

Since the range of delay time in which the correlation can be obtained is smaller than one chip length of the PN code, it is also conceivable that the operation part 11 calculates the distance based on a time corrected by a half chip length from a point of time when the correlation begins to be obtained (or ends).

Figure 4:
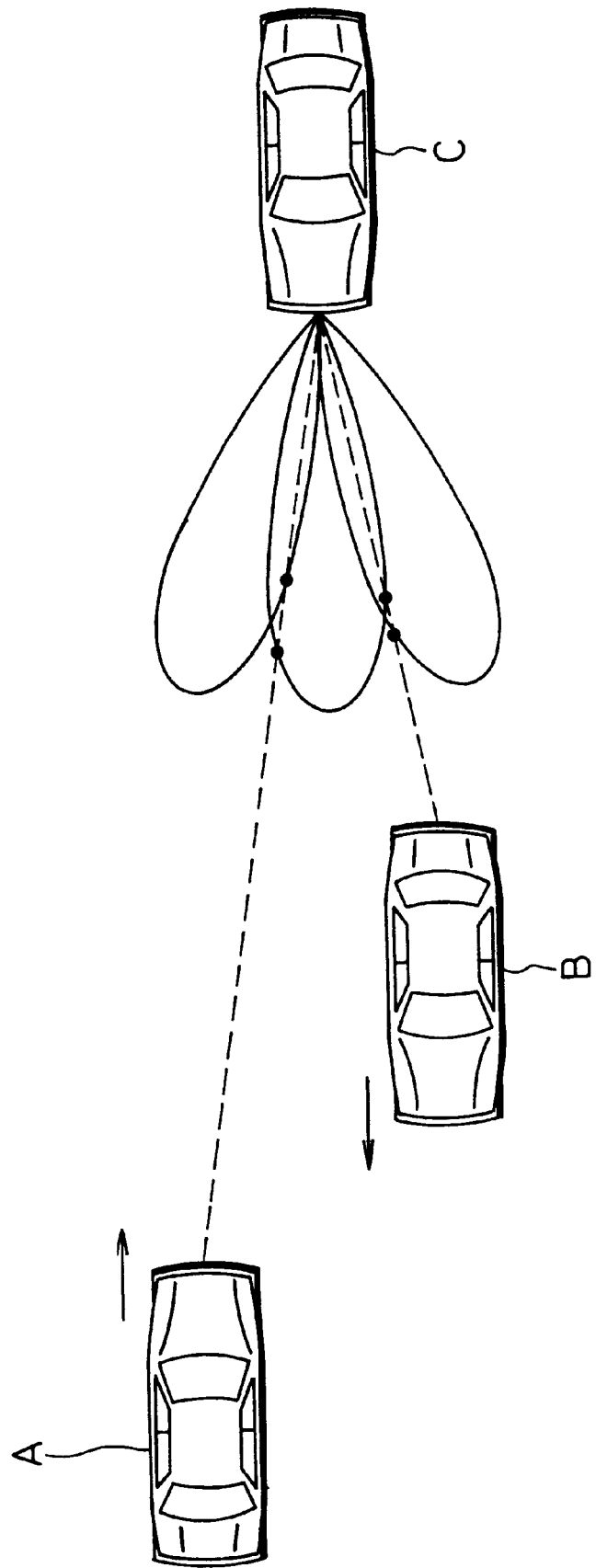
FIG. 4 is a diagram for explaining operation of a radar device of a first embodiment installed in a vehicle, similar to FIG. 2.

Next, the operation of the radar device of the present embodiment will be explained based on FIG. 4. FIG. 4 shows the case in which a vehicle C having a radar device of the present embodiment installed therein measures the azimuths of two objects (vehicles A and B) existing in front.

In this case, the azimuth of the vehicle A is obtained as described above. In respect of the vehicle B, since the distance from the vehicle C to the vehicle B is different from the distance from the vehicle A to the vehicle B, the received signal from the vehicle B is correlated with a PN code having a delay time different from the delay time of the PN code with which the received signal from the vehicle A is correlated. Thus, in respect of the vehicle B, the operation part 11 obtains correlation between the received signal from the antennas 16a and the PN code and between the received signal from the antennas 16c and the PN code, and obtains the maximum values of the respective slide widths in which the respective correlation values exceed the threshold S. Then, the operation part 11 compares the ratio of those maximum values with the stored beam pattern characteristic, thereby to obtain the azimuth of the vehicle B.

As indicated by arrows in FIG. 4, the vehicle A travels in the direction of the vehicle C, and the vehicle B travels in the opposite direction. Therefore, the vehicles A and B arrives at the same distance from the vehicle C. At that point of time, the correlation is obtained, in respect of the vehicles A and B, with the PN code having the same delay time. In this case, however, since the signs of relative speed of the vehicles A and B are different from each other, the vehicles A and B are treated as separate ones, based on the tracking performed as described later. Even if the vehicles A and B are tracked as the same one object for a while, false tracking can be detected by comparing received strengths as described later, before the ratio of those strengths is calculated. Thus, in the present embodiment, the respective azimuths of different objects existing at the same distance can be measured.

As described above, in the present embodiment, a reflected wave from an object is received by switching a plurality of receiving antennas, and each slide width in which a correlation value between a received signal by each antenna and a PN code, which is detected using the spread spectrum modulation technique, exceeds a threshold S is obtained. Based on thus obtained slide widths and the beam pattern characteristic of the antennas, an azimuth of an object is measured. Thus, in the present embodiment, measurement of an azimuth of an object can be carried out with simple structure. The present embodiment does not need a motor, an actuator or their power source, each of which is needed in the aforementioned conventional mechanical-scanning antenna, or a phase converter, which is needed in the conventional phased-array antenna, or circuits for detecting an amplitude, a phase and so forth of a received signal, which are needed in the conventional signal processing system, and can perform measurement of an azimuth of an object with simple structure at low cost.

In the present embodiment, supposing that such a receiving antenna is provided that the azimuth measurement range θ as shown in FIG. 2 is 100°, the half power beamwidth coefficient k is 50.8°, and the wavelength λ at its used frequency is 0.004955 [m], the azimuth measurement can be performed by using three planar array antennas having a half power beamwidth of 5° which are arranged so staggered that their beam patterns partly overlap with each other. In this case, the horizontal array length D of the antenna is derived from the expression (1) as follows:

0.5:50.8(0.004955/D)

D÷0.0503[m]

Thus, the present embodiment only needs three antennas of 5 [cm] at each edge side, so that the occupied space is a twenty-fifth of the occupied space in the conventional cases (for example, the conventional system which switches beams of a plurality of antennas).

Thus, it is clear that the radar device according to the present embodiment is suited to be installed in a vehicle since it can be made with simple structure at low cost, and the occupied space can be largely reduced.

Though the present embodiment has been explained taking such an example that three receiving antennas are used, the present invention is not limited to that case. For example, in the case in which two or more than four receiving antennas are used, the azimuth of an object can be measured in the same manner as in the above described embodiment.

Figure 5:
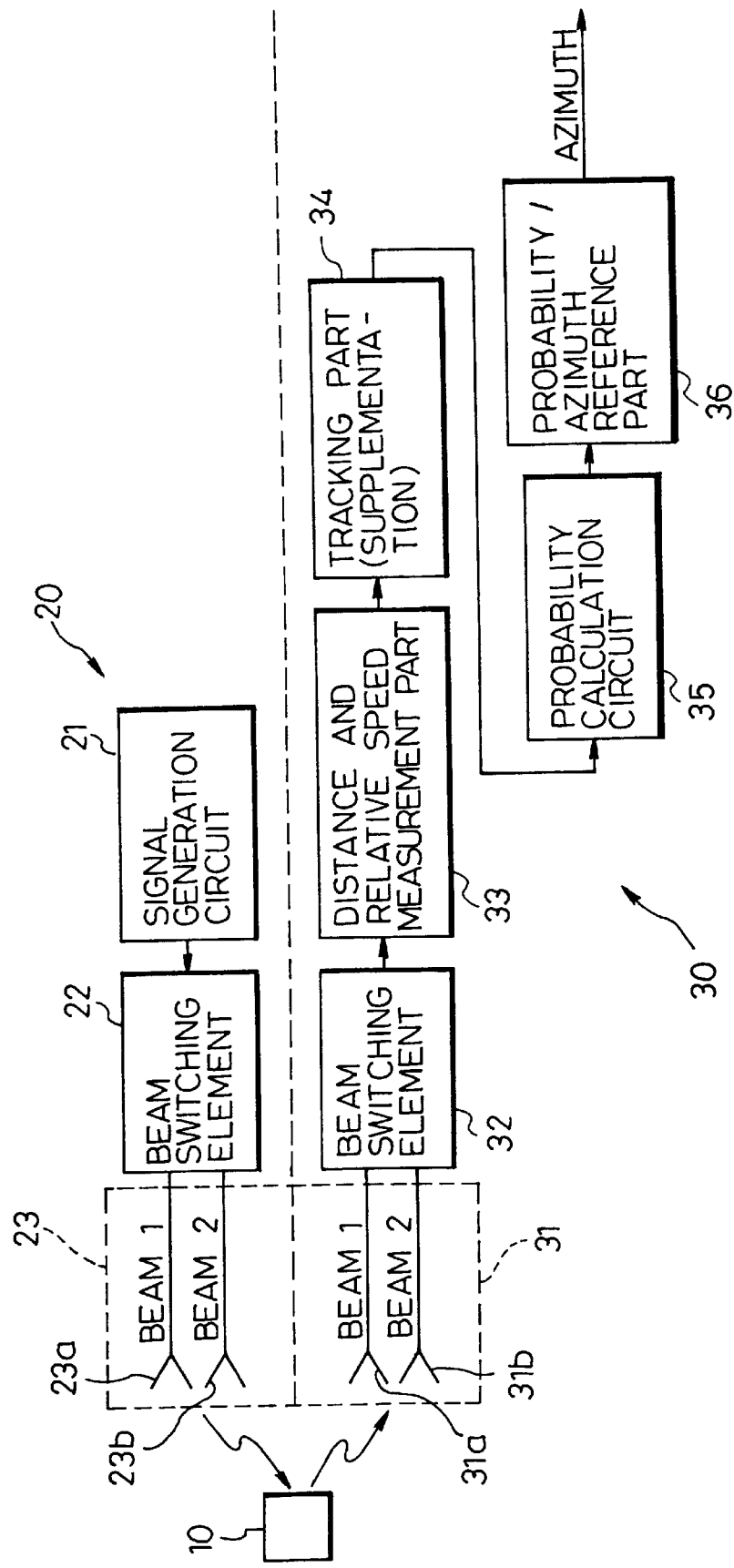
FIG. 5 is a block diagram showing formation of a second embodiment of a radar device according to the present invention.

FIG. 5 is a block diagram showing formation of a second embodiment of a radar device according to the present invention.

As shown in FIG. 5, a radar device according to a second embodiment comprises transmitting means 20 for transmitting an electric wave and receiving means 30 for receiving a reflected wave of the electric wave from an object 10.

The transmitting means 20 comprises a signal generation circuit 21 for generating a signal, a beam switching element 22 for switching a transmitting antenna which performs transmission, and a transmitting antenna unit 23. The transmitting antenna unit 23 has a plurality of transmitting antennas 23a and 23b.

The receiving means 30 comprises a receiving antenna unit 23 31, a beam switching element 32 for switching a receiving antenna which performs reception, and a distance and relative speed measurement part 33 for measuring a distance to and a relative speed of an object, a tracking part 34 for supplementing data, a probability calculation circuit 35 for calculating probability that an object is detected by each beam, and a probability/azimuth reference part 36 for obtaining an azimuth based on the calculated probability. The receiving antenna unit 31 has a plurality of receiving antennas 31a and 31b which correspond to the transmitting antennas 23a and 23B.

The radar device of this embodiment can be formed using, for example, techniques for a tracking radar, the spread spectrum modulation technique and so forth.

In the transmitting means 20, the signal generation circuit 21 generates such a transmission signal that can be distinguished from other signals when the electric wave reflected by an object is received. The beam switching element 22 switches the antenna under a predetermined control, so that the electric wave may be outputted from the transmitting antenna 23a or 23b for a specified time each.

Figure 25:
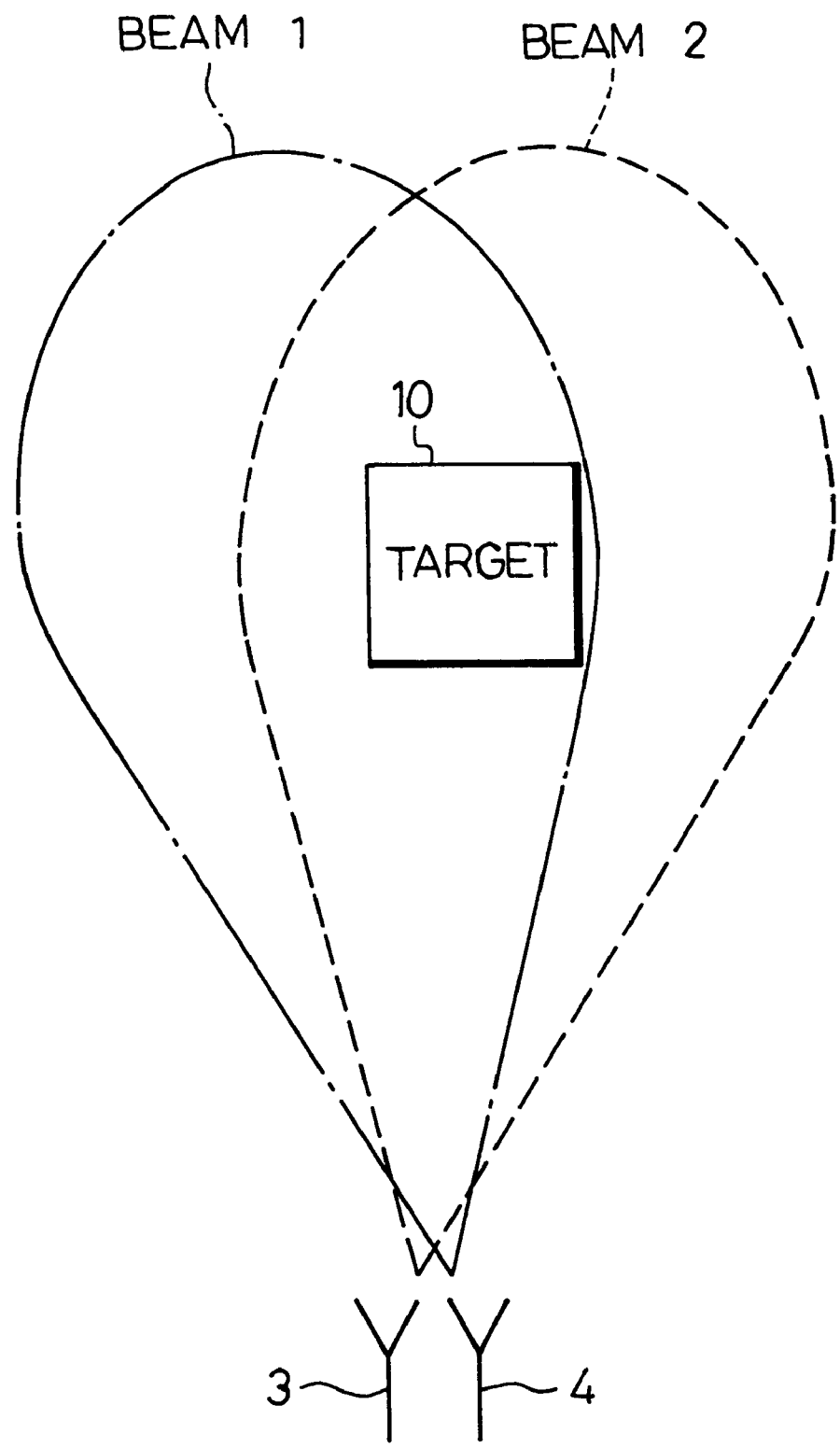
FIG. 25 is a relational diagram showing relation between two beam patterns.

The transmitting antenna 23a outputs the electric wave of beam 1, and the transmitting antenna 23b outputs the electric wave of beam 2. The beams 1 and 2 have directivities different from each other. The transmitting antennas 23a and 23b are so arranged that their beam patterns are adjacent to each other, partly overlapping with each other, as shown in FIG. 25. Thus, the transmitting antennas 23a and 23b are switched by the beam switching element 22 to output, a predetermined number of times, the electric waves having directivity different from each other.

In the receiving means 30, the receiving antennas 31a and 31b input the reflected waves (beams 1 and 2) of the electric waves transmitted by the transmitting means 20, reflected from an object. The beam switching element 32 switches the antennas so that a signal received by the receiving antenna 31a or 31b may be inputted.

The distance and relative speed measurement part 33 judges whether the received signal is the reflected wave of the transmission signal transmitted by the transmitting means 20, reflected from an object. If the received signal is the reflected wave of the transmission signal transmitted by the transmitting means 20, the distance and relative speed measurement part 33 obtains the delay between the transmission signal and the received signal as distance information, and measures the distance to an object based on that distance information. The distance and relative speed measurement part 33 further measures the Doppler frequency of the received signal, and obtains the relative speed of an object based on that Doppler frequency.

The tracking part 34 chooses values relative to the same target from among the values measured by a plurality of antennas to relate those values with each other, accumulates such measured values relative to each target for a certain points of time, and calculates predictive values. The values measured by a plurality of antennas are related with each other, depending on degree of approximation between the measured values and the predicted values of distance and of relative speed. This applies also to the case in which the values are renewed and newly related with each other.

The probability calculation circuit 35 counts how many times the tracking part 34 has supplemented data while the measurement for detecting an object has been performed a predetermined number of times. Then, the probability calculation circuit 35 calculates the detection probability p based on the frequency of how often an object has been detected by each beam (measured value), by using the following expression:

p={(predetermined number of how many times measurement is performed)−(number of how many times supplement has been performed while the measurement has been performed that predetermined number of times)}/(predetermined number of how many times measurement is performed)

The number of how many times measurement is performed is predetermined depending on capacity of memory provided for tracking an object. When the measurement is performed exceeding that predetermined number of times, the oldest one of the data stored in the memory for each target is replaced by a current measured value, and the probability is newly calculated according to the above definition. In the case in which there exists a single target, the probabilities p1 and p2 of detection by the beams 1 and 2, respectively, are obtained by the above described calculation. Then, the probability calculation circuit 35 obtains a pair a12 of probabilities of detection of the same object by each beam, as shown below.

a12=(p1, p2)

Based on that obtained pair a12 of probabilities, the probability/azimuth reference circuit 36 judges an azimuth of an object, referring to a look up table (not shown) which is provided in advance, for example, in the form of ROM (read only memory). Specifically, since the value a12 of pair of detection probabilities is specific to the azimuth, a look up table in which the pair of detection probabilities and the azimuth are related with each other is provided in advance. The probability/azimuth reference circuit 36 searches the look up table by using the obtained pair a12 of detection probabilities as a azimuth readout function F, thereby to judge the azimuth θ of an object.

θ=F(a12)

In the case in which there exist a plurality of targets, the azimuths of those targets can be obtained in the same manner.

Next, the relation between the probability of detection of an object and the azimuth to be detected of the object will be explained.

First, the relation between the signal-to-noise power ratio (SNR) and the detection probability will be explained. Supposing that there exists noise in a channel between the transmitting means and the receiving means, "omissions" may occur in the result of measurement due to the influence of that noise. In that case, probability that the receiving means correctly detects existence of a signal, that is, signal detection probability pd is given by the following expression:

$$pd = \exp[-T/pn(1+\gamma a)] \qquad (2)$$

where

T: threshold as a criterion pn: power of noise at the time of judgment

γa: average SNR [W]

Probability of falsely judging that there exists a signal when no signal is transmitted, that is, false detection probability pfd is given by the following expression:

$$pfd = \exp[-T/pn] \qquad (3)$$

From the expressions (2) and (3), the signal detection probability pd can be expressed as follows:

$$pd = pfd^{1/(1+\gamma a)} \quad (4)$$

FIG. 6 is a relational diagram showing an example of relation between the SNR and the detection probability, for example, where the false detection probability Pfd=$10^{-6}$.

As is clear form FIG. 6, there exists one-to-one relation between the SNR and the detection probability as shown in Table 1.

TABLE 1

| SNR[dB] | 7.0 | 8.8 | 10.2 | 11.3 | 12.8 | 14.2 | 15.7 | 17.7 | 21.0 |
|---|---|---|---|---|---|---|---|---|---|
| Detection Probability | 0.1 | 0.2 | 0.3 | 0.4 | 0.5 | 0.6 | 0.7 | 0.8 | 0.9 |

Figure 7:
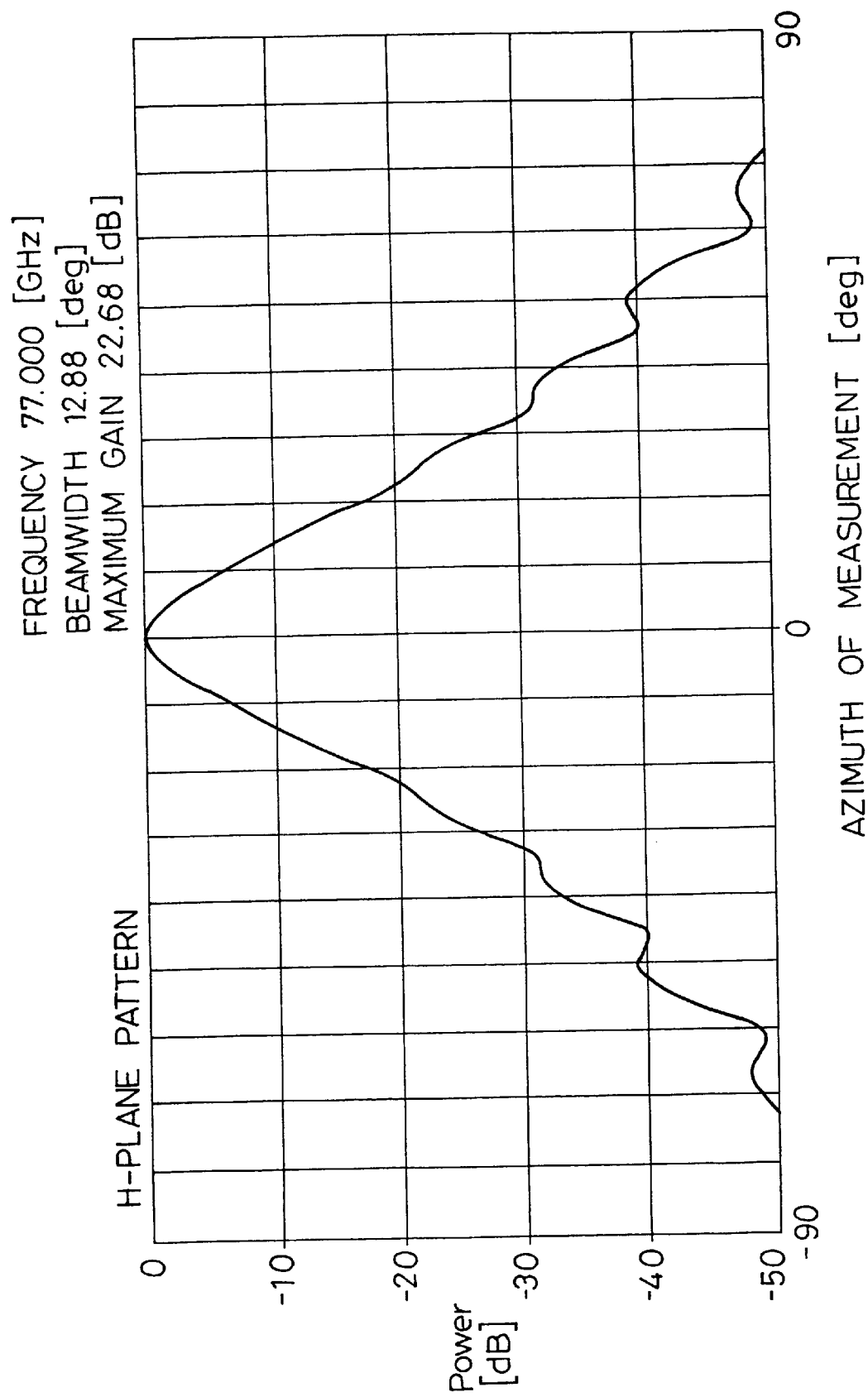
FIG. 7 is a characteristic diagram showing a typical antenna-directional-characteristic.

FIG. 7 is a characteristic diagram showing a typical antenna-directional-characteristic used in the present invention. Here, the transmit-receive composite gain can be considered as approximately corresponding to a curve given by the following expression:

$$G(x) = ax^2 + zbx + c \begin{bmatrix} z = 1 & (\text{when } x < 0) \\ z = -1 & (\text{when } x > 0) \end{bmatrix}$$

where x: azimuth [deg], where 0 represents the front a(<0), b: real constants c: maximum gain [dB] when x=0

Figure 8:
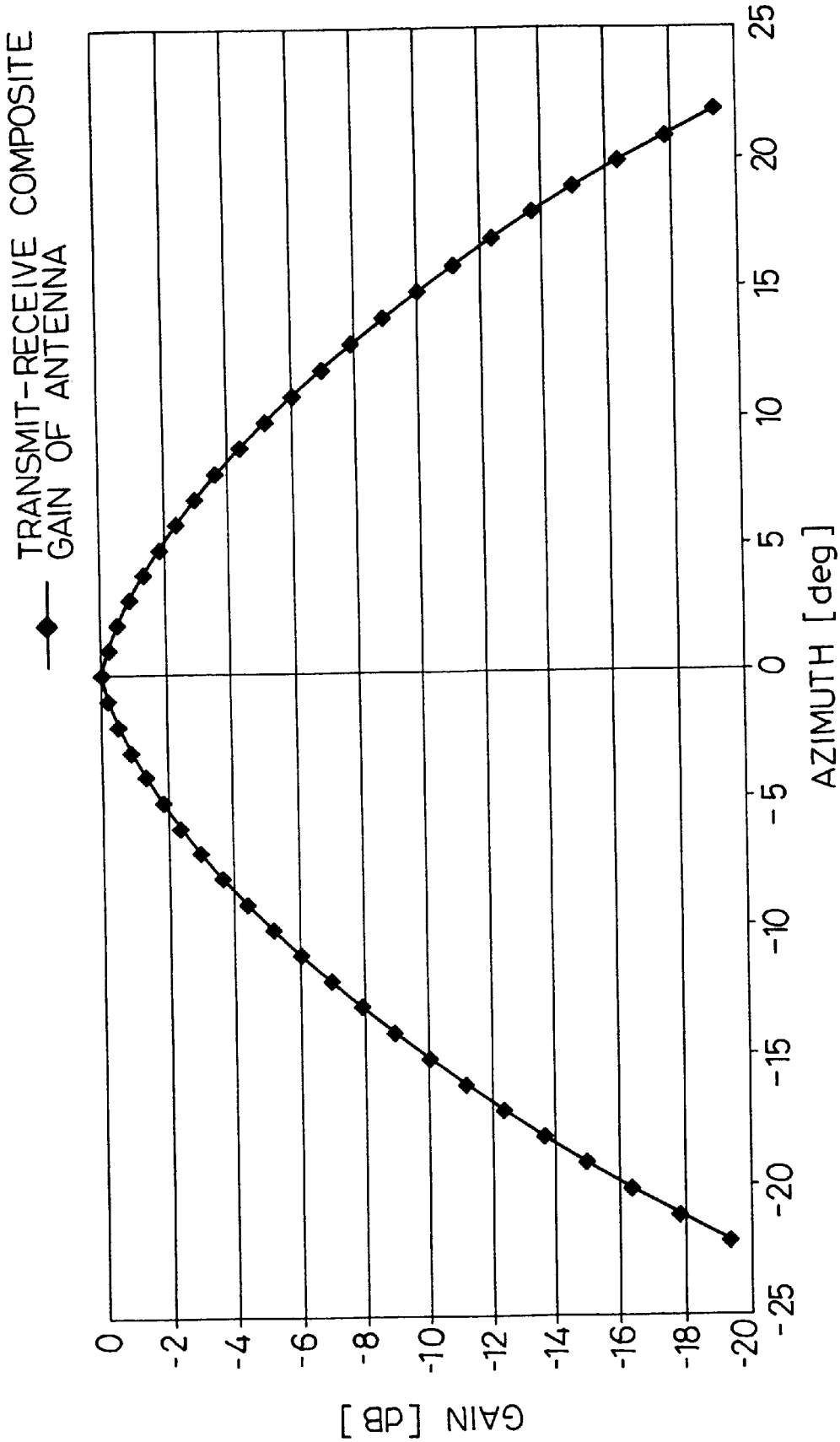
FIG. 8 is a relational diagram showing relation between gain and azimuth of a transmitting or receiving antenna.

As a diagram simulating the directional characteristic shown in FIG. 7, FIG. 8 shows the relation between the gain and the azimuth of a transmitting or receiving antenna, supposing, for example, that a=−0.03, b=0.218 and C=0.

As is clear from FIG. 8, the gain of a transmitting or receiving antenna reduces remarkably, according to the deviation from the center of the antenna in the lateral direction.

Next, the relation between the detected azimuth and the detection probability will be described. Supposing, for example, that a target (object) is detected at an azimuth x [deg] with a probability px, a SNR γx [dB] at the time of reception is, according to the expression (4), expressed as follows:

$$\gamma x = 10 \log(\log pfd / \log px - 1) \quad (6)$$

From the expression (5), there exists the following relation:

$$\gamma x = ax^2 + zbx + c \begin{bmatrix} z = 1 & (\text{when } x < 0) \\ z = -1 & (\text{when } x > 0) \end{bmatrix} \quad (7)$$

Solving the expression (7) for x, the following relation is obtained:

$$x = \begin{bmatrix} \left[ -b + \sqrt{b^2 - 4a(c - \gamma x)} \right] / 2a & \text{(positive azimuth)} \\ \left[ b - \sqrt{b^2 - 4a(c - \gamma x)} \right] / 2a & \text{(negative azimuth)} \end{bmatrix} \quad (8)$$

When the expression (6) is substituted into the expression (8), the following is obtained:

$$x = \begin{bmatrix} \left\{ -b + \sqrt{b^2 - 4a[c - 10\log(\log p\, fd / \log px - 1)]} \right\} / 2a \\ \left\{ b - \sqrt{b^2 - 4a[c - 10\log(\log p\, fd / \log px - 1)]} \right\} / 2a \end{bmatrix} \quad (9)$$

From the above, it is clear that the detected azimuth is a function of the detection probability.

Figure 9:
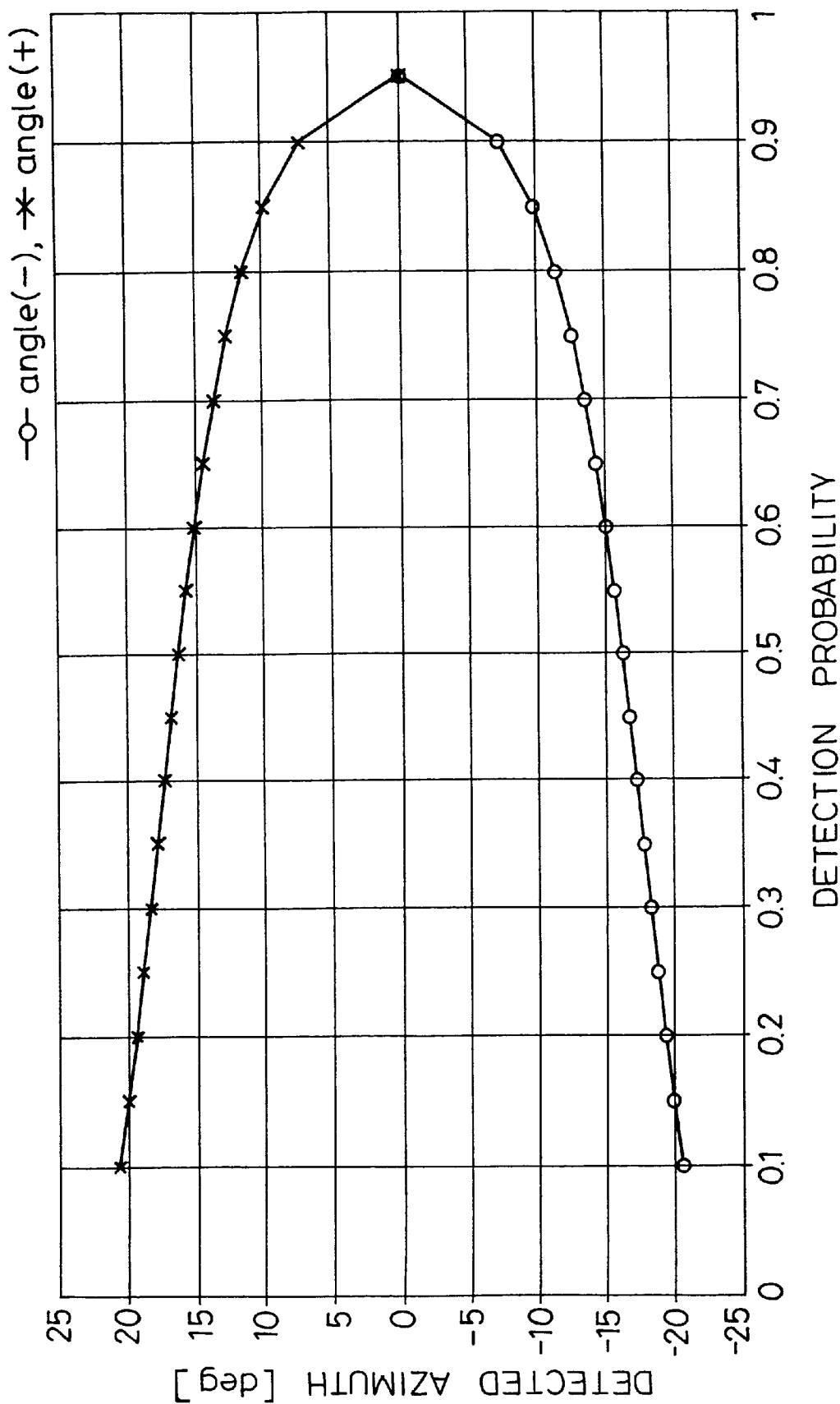
FIG. 9 is a relational diagram showing relation between detection probability and azimuth in the case of a single beam.

Here, as a standard target, such a target that the SNR is 24 [dB] when the target is in front of an antenna and at a certain distance therefrom, that is, such a target that c=24[dB] in the expression (9) is taken up. If the measurement is performed using a single beam having the same transmit-receive characteristic as shown in FIG. 7 (that is, when a=−0.03 and b=0.218), the relation between the detection probability and the azimuth describes a curve as shown in FIG. 9.

However, in the case of using a single beam, there are the following problems:

1. The azimuth is only detected as an absolute value. For example, in FIG. 9, the azimuth corresponding to the detection probability of 0.6 is 15 [deg] and −15 [deg]. Thus, the azimuth can be detected only in the form of an absolute value.

2. There are the cases to which the standard relation between the detection probability and the azimuth does not apply, due to the difference in radar cross section of a target.

The present invention deals with the problems 1 and 2, using a plurality of beams as described above.

First, it can be seen that the problem 1 can be overcome by using a plurality of beams staggered by a known azimuth. In the present invention, for example, two beams having the characteristic shown in FIG. 9 are provided. The two beams 1 and 2 are arranged having the center of the beam 1 set at 0 [deg] and the center of the beam 2 set at 21 [deg], so that the beam patterns thereof partly overlap with each other. When the same target is measured by those two beams having the above described characteristic, the positive azimuth area of the beam 1 (the area in which the azimuth is marked by×in FIG. 10) is the negative azimuth area of the beam 2 (the area in which the azimuth is marked by Δ in FIG. 10). Thus, in the present embodiment, the detection area is composed of three areas, that is, the area in which the azimuth can be detected only by the beam 1 (hereunder referred to as "area 1"), the area in which the azimuth can be detected by both the beams 1 and 2 (hereunder referred to as "area 2") and the area in which the azimuth can be detected only by the beam 2 (hereunder referred to as "area 3"). Therefore, the foregoing problem that the sign of azimuth is unknown is overcome in the present embodiment.

Figure 10:
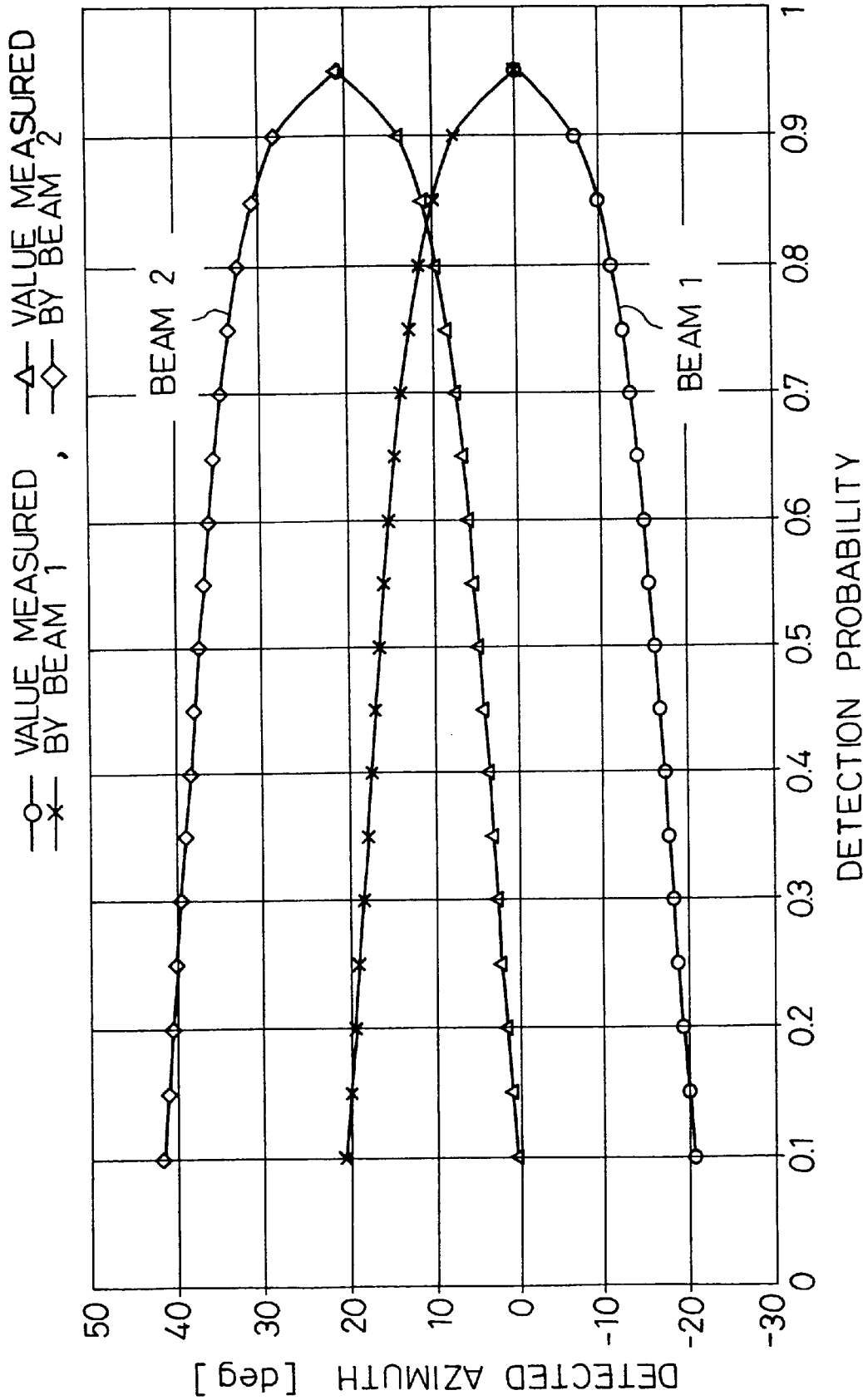
FIG. 10 is a relational diagram showing relation between detection probability and azimuth in the case of two beams.

For example, in FIG. 10, if the detection probability by the beam 1 is 0.7 and the detection probability by the beam 2 is 0, the detected azimuth is −14[deg]. If the detection probability by the beam 1 is 0.7 and the detection probability by the beam 2 is 0.9, the detected azimuth is 14[deg]. If the detection probability by the beam 1 is 0 and the detection probability by the beam 2 is 0.9, the detected azimuth is 28[deg].

To meet the problem 2, a target having a radar cross section is detected combining two beams, for example, as shown in FIG. 10. By doing so, if a target has a radar cross section allowing detection by the beams 1 and 2, an azimuth within the area 2 and existence or non-existence in the areas 1 and 3 can be detected.

Here, having a radar cross section larger than that in the standard case of FIG. 10 is equivalent to having an increased c in the expression (9). In that case, an azimuth can be detected by using a plurality of beams and comparing the values of detection probabilities obtained by the respective beams.

It is so designed that the detection probability by each beam may take a value between 0 and 0.95. Supposing that the detection probability obtained by the beam 1 is represented by p1 and the detection probability obtained by the beam 2 is represented by p2, pairs of p1 and p2 are made in the area 2. The combination of those two probabilities is specific to each azimuth, regardless of the value of c. Therefore, if the relation between the combination of probabilities and the azimuth is mapped in advance, it is possible to meet a change in SNR not covered by the design, within the area for which the relation between the combination of probabilities and the azimuth is mapped.

Specifically, an efficient map can be made, for example, using an internal ROM (read only memory) in the probability/azimuth reference part 36 to store the azimuth at an address corresponding to the pair of possibilities. In the present embodiment, the respective detection probabilities p1 and p2 are expressed in the form of four digit hexadecimal numbers so that a pair of detection probabilities may represent an address (a hexadecimal number corresponding to the probability p1 forms upper four digits of an address, and a hexadecimal number corresponding to the probability p2 forms lower four digits thereof). For example, supposing that the respective probabilities are obtained down to two places of decimals between [0.00] and [1.00], the respective probabilities are expressed in the form of corresponding hexadecimal numbers between [0000] and [0064], and the address is expressed, combining the pair of those probabilities, between [00000000] and [00640064], at which the azimuth (hexadecimal number) corresponding to those probabilities is stored. The map is made using the ROM in this way. In FIG. 10 described above, the azimuth is expressed also as a negative number. When the azimuth can be expressed as a if negative number, the azimuth may be stored in the ROM, having the information for discriminating between plus and minus attached thereto. Alternatively, 0[deg] as a center may be moved to the position of the upper limit value 50[deg] or the lower limit value −30[deg] in FIG. 10, so that the azimuth may be expressed and stored on the basis of thus moved 0[deg].

Figure 11:
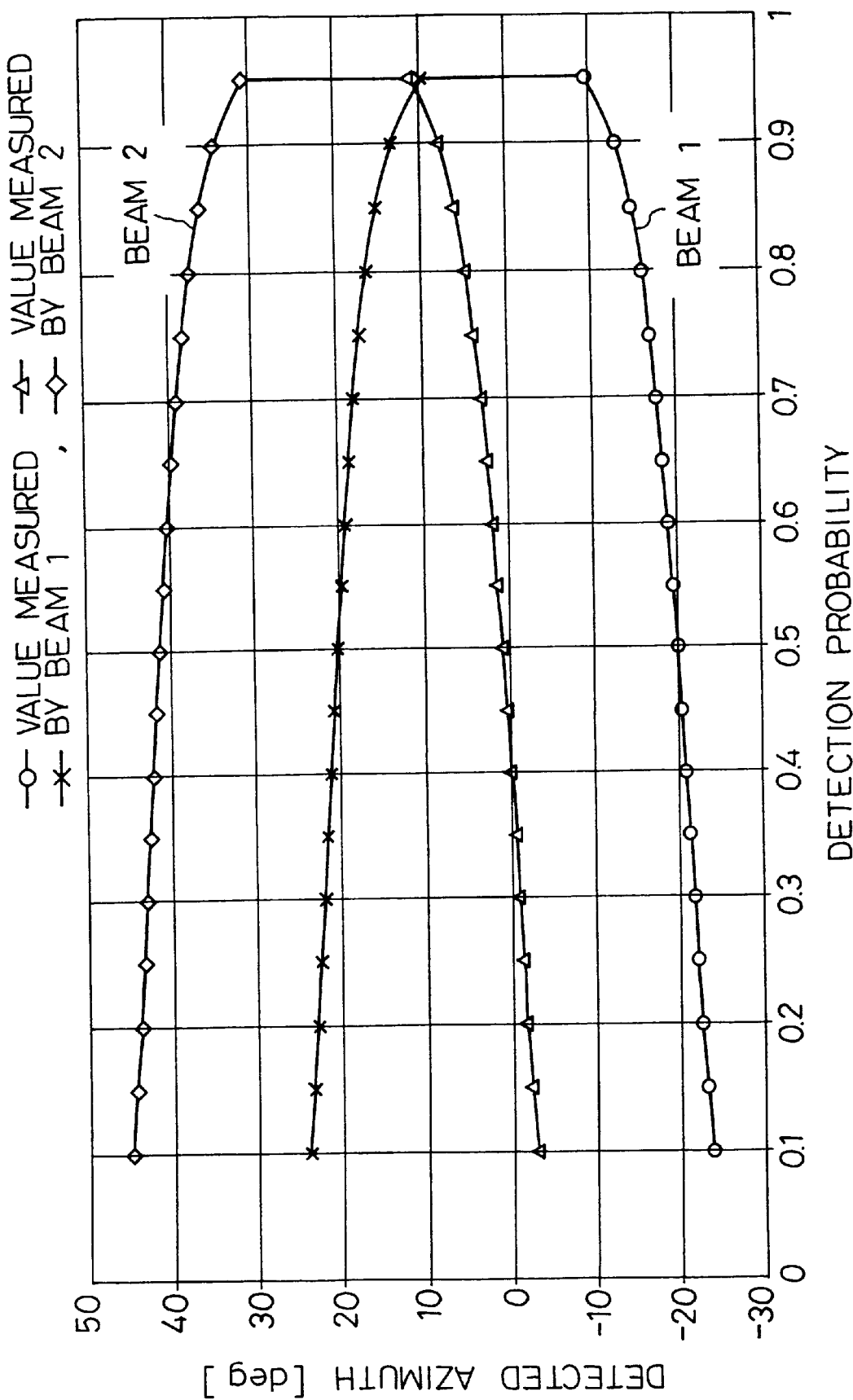
FIG. 11 is a relational diagram showing relation between detection probability and azimuth in the case in which a radar cross section is larger than that in the case of FIG. 10.

FIG. 11 shows a characteristic curve of the case in which c is 29[dB], that is, higher by 5[dB] than c in the standard case corresponding to FIG. 10.

The characteristic curve in FIG. 11 provides an extended horizontal detection area, while the azimuth tends to be detected uncertainly near the centers of the beams 1 and 2.

Therefore, the probability/azimuth reference part 36 uses the above described map system. In respect of the area 2, the probability/azimuth reference part 36 searches the internal ROM, using a pair of probabilities obtained by the probability calculation circuit 35 as an address, thereby to read out the specific azimuth corresponding to that pair of probabilities.

In respect of the areas 1 and 3, a read-out azimuth tends to be biased to the center, as compared with an actual azimuth. However, at least it is known that an object exists at an azimuth close to a read-out azimuth. On the other hand, having a radar cross section smaller than the standard one is equivalent to having an decreased c in the expression (9).

Figure 12:
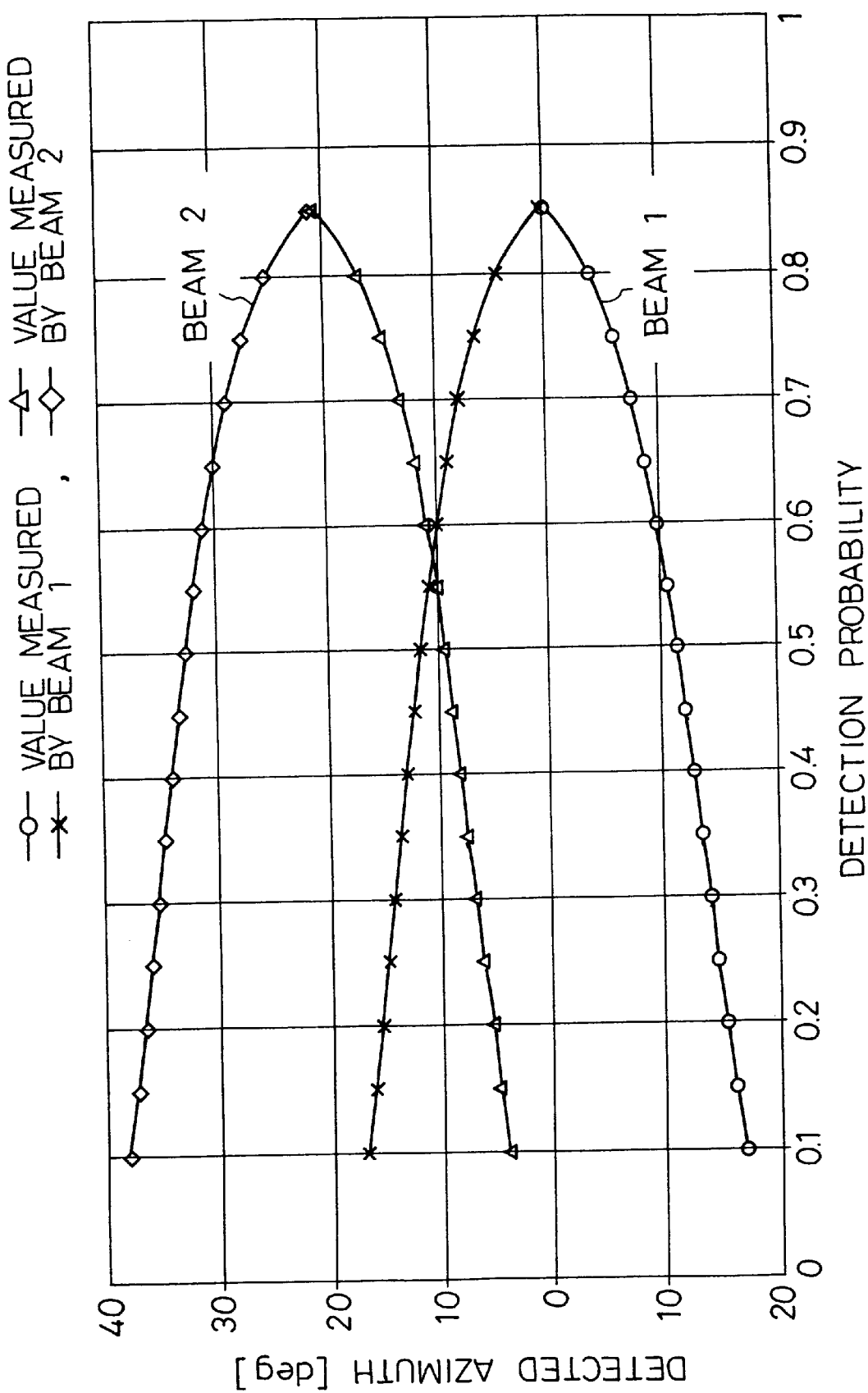
FIG. 12 is a relational diagram showing relation between detection probability and azimuth in the case in which a radar cross section is smaller than that in the case of FIG. 10.

FIG. 12 shows a characteristic curve of the case in which c is 19[dB], that is, lower by 5[dB] than c in the standard case corresponding to FIG. 10.

Though the characteristic curves in FIG. 12 provides an area 2 narrower than that in the standard case of FIG. 10, a specific corresponding azimuth can be read out, using the above described map system. In the characteristic curve in FIG. 12, however, the areas 1 and 3 are extended, which increases uncertain detection of azimuths.

Therefore, in the radar device according to the present invention, for example, the used beam patterns are so provided as to rather broadly overlap with each other, or three or more beams are used in such manner that the adjacent beam patterns partly overlap with each other. Thus, in the present embodiment, the areas where the adjacent beam patterns overlap with each other are increased, so that the above described inconveniences can be overcome. In this case, though the number of addresses in the ROM, that is, the number of pairs of probabilities are increased with the increase in number of beams, the reliability of azimuth detection is improved since the areas where the detection is made by two beams are increased.

As described above, in the present embodiment, probability of detection of an object by each beam is obtained by tracking, and using the pair of thus obtained probabilities as an address, a look up table which stores azimuths on the basis of beam pattern characteristic is searched, thereby to obtain the corresponding azimuth of the object. Therefore, in the present invention, the reliability of azimuth detection can be improved by supplementing the lack of data with simple structure, not requiring provision of additional hardware for estimating probabilities (received strength estimating circuit).

Though the present embodiment uses each two antennas for transmission and reception, a single transmitting antenna having a wide beam angle can replace the two transmitting antennas. Further, two transmit-receive antennas can be used in place of two transmitting antennas and two receiving antennas.

Next, an embodiment of a radar device which can reduce the influence of a side lobe will be explained.

Figure 13:
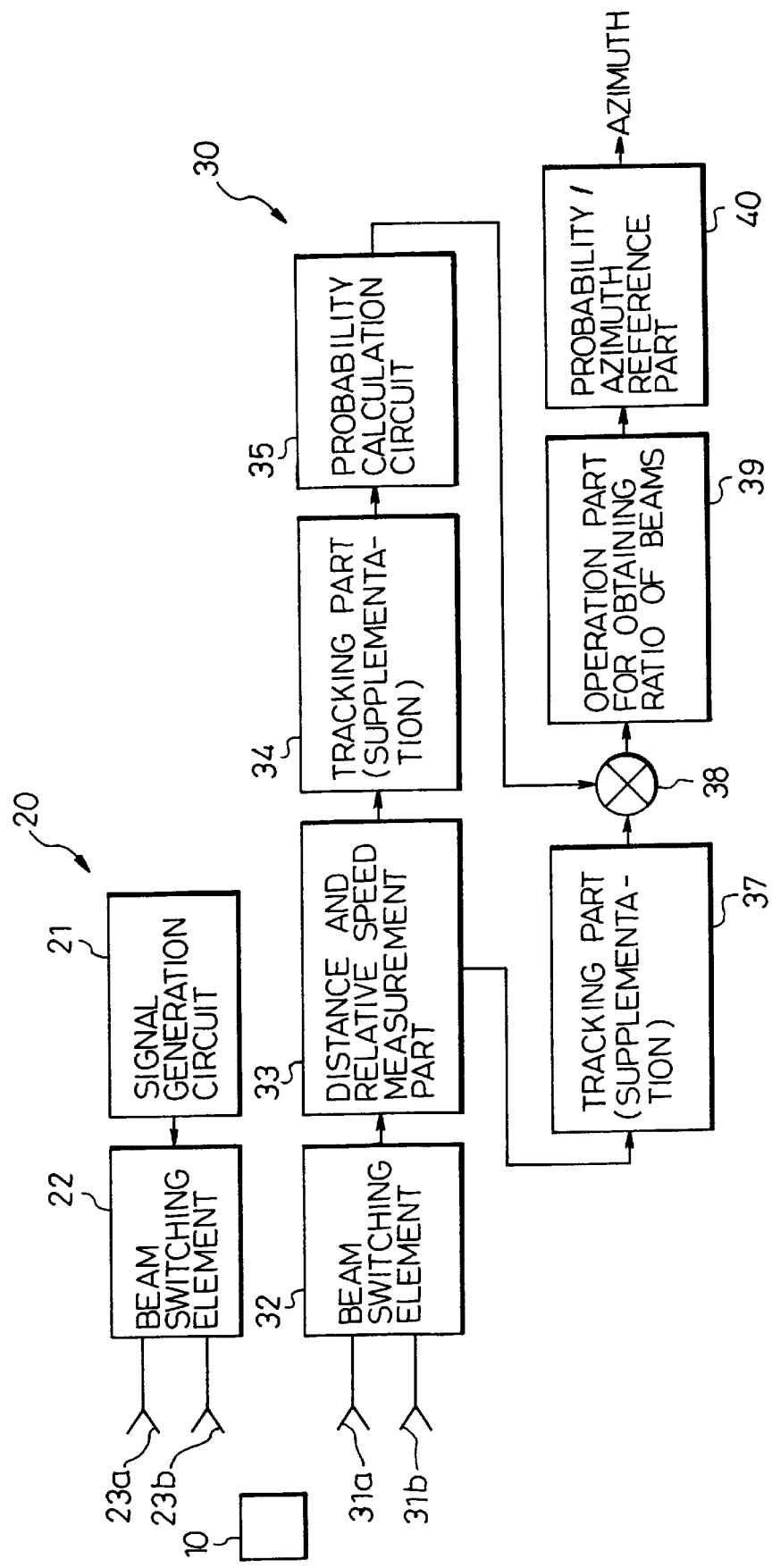
FIG. 13 is a block diagram showing formation of a third embodiment of a radar device according to the present invention.

FIG. 13 is a block diagram showing formation of a third embodiment of a radar device according to the present invention. As in the case of the second embodiment, the third embodiment can be formed using techniques for a tracking radar, the spread spectrum modulation technique and so forth.

As shown in FIG. 13, the transmitting means 20 has the same formation as in the case of the second embodiment shown in FIG. 5. The receiving means 30 comprises receiving antennas 31a and 31b, a beam switching element 32, a distance and relative speed measurement part 33, a tracking part 34 and a probability calculation circuit 35, which have respectively similar structure to that in the case of the second embodiment, and further comprises a tracking part 37 for supplementing data on strength of a received signal, a multiplier 38 for obtaining probability strength, an operation part 39 for obtaining probability strength ratio based on the probability strength, and a ratio/azimuth reference part 40 for obtaining a corresponding azimuth based on the probability strength ratio.

The distance and relative speed measurement part 33 obtains the strength of the inputted received signal as a received strength (voltage). The tracking part 37 chooses values relative to the same target from among the values measured by a plurality of antennas to relate those values with each other, accumulates such measured values relative to each target for a certain points of time, and calculates predictive values. The values measured by a plurality of antennas are related with each other, depending on degree of approximation between the measured values and the predicted values of distance and of relative speed. This applies also to the case in which the values are renewed and newly related with each other.

The multiplier 38 multiplies data on detection probability which is inputted from the probability calculation circuit 35 and data on strength which is inputted from the tracking part 37, thereby to output probability strength (probability voltage). For example, in the case in which there exists a single target, the multiplier 38 multiplies detection probabilities p1, p2 by beams 1, 2 and received strengths V1, V2 by beams 1, 2, respectively, and outputs the resulting probability voltages p1V1 and p2V2 to the operation part 39.

The operation part 39 calculates probability voltage ratio according to the following expression, and outputs the result of the calculation to the ratio/azimuth reference part 40.

Probability voltage ratio=(p1V1−p2V2)/(p1V1+p2V2)

Based on the obtained probability voltage ratio, the ratio/azimuth reference part 40 judges the azimuth of an object, referring to a look up table (not shown) which is provided in advance in the form of ROM. Specifically, in the present embodiment, a look up table in which the probability voltage ratio and the azimuth are related with each other is provided in advance, based on both beam pattern characteristics. The ratio/azimuth reference part 40 searches the look up table, using the obtained probability voltage ratio as an azimuth readout function, thereby to judge the azimuth of an object. In the case in which there exist a plurality of targets, the azimuths of those targets can be obtained in the same manner.

Next, the relation between the probability voltage ratio and the detected azimuth of an object will be explained.

Generally, in respect of the relation between voltage and azimuth, an antenna has different gains depending on the azimuth. Thus, the directional pattern of an antenna is a function of the azimuth. When the gain is expressed as $F(\theta)[dB]$, the voltage value $V(\theta)$ is given by the following expression, based on the relation between power and voltage.

$$V(\theta)=10^{F(\theta)/20}$$

In the case in which two beams are used, a set of voltage values (two kinds of voltage values) are obtained at one time of measurement. When thus obtained set of voltage values are expressed as $V1(\theta)$ and $V2(\theta)$, the voltage ratio $R(\theta)$ at that time is given by the following expression.

$$R(\theta)=[V1(\theta)-V2(\theta)]/[V1(\theta)+V2(\theta)]$$

Therefore, the azimuth can be obtained reversely from the above expression of the voltage ratio.

Supposing, for example, that a certain object (target) has been detected four times while measurement using the radar has been performed six times, the distance and the relative speed to be outputted from the tracking part are calculated using the values detected four times out of six times of measurement.

Figure 14:
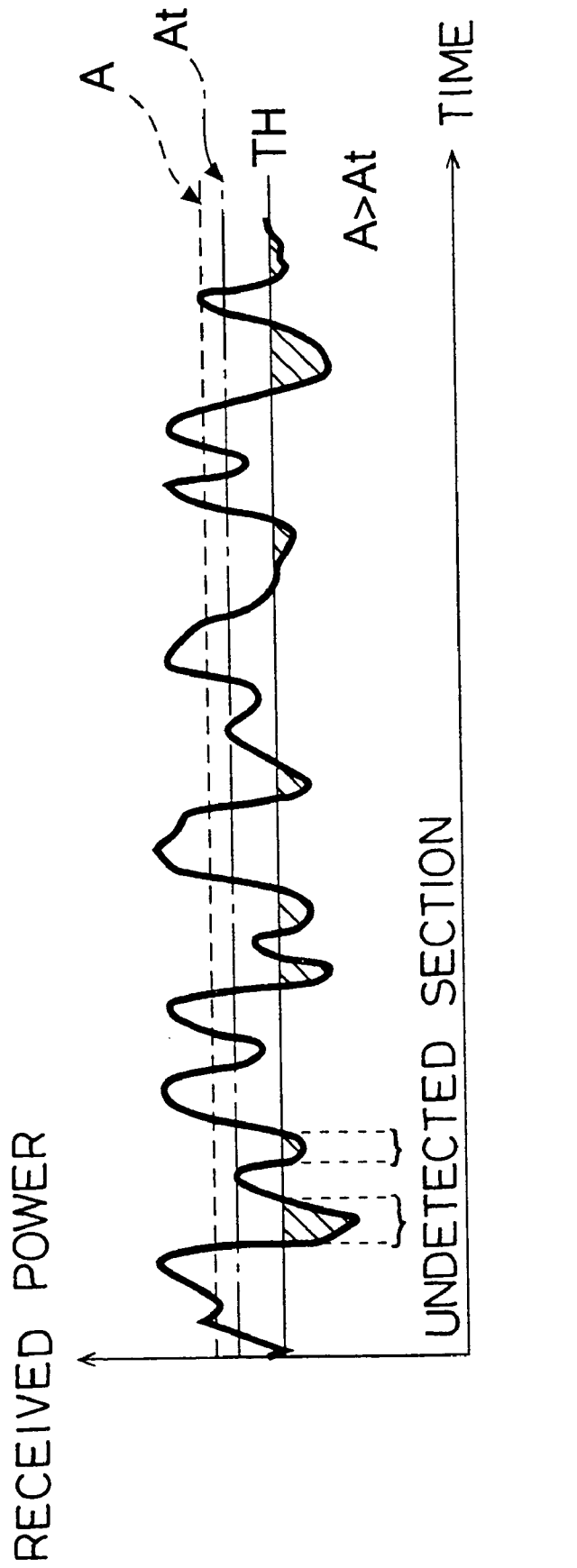
FIG. 14 is a relational diagram showing an example of relation between a level of reflected wave (received strength) and a threshold for detecting signals.

However, in respect of the strength of received signal, based on which the azimuth is calculated, the values which have failed to be detected twice need to be considered. Supposing that the relation between the level of reflected wave from a certain object (received power) and the threshold TH for detecting signals is as shown in FIG. 14, that is, the predetermined threshold TH is severe (high) relative to the level of received strength, the predicted average A (corresponding to the outputs V1 and V2 from the tracking part 37) is higher than the true average At (corresponding to the outputs p1V1 and p2V2 from the multiplier 38).

Figure 15:
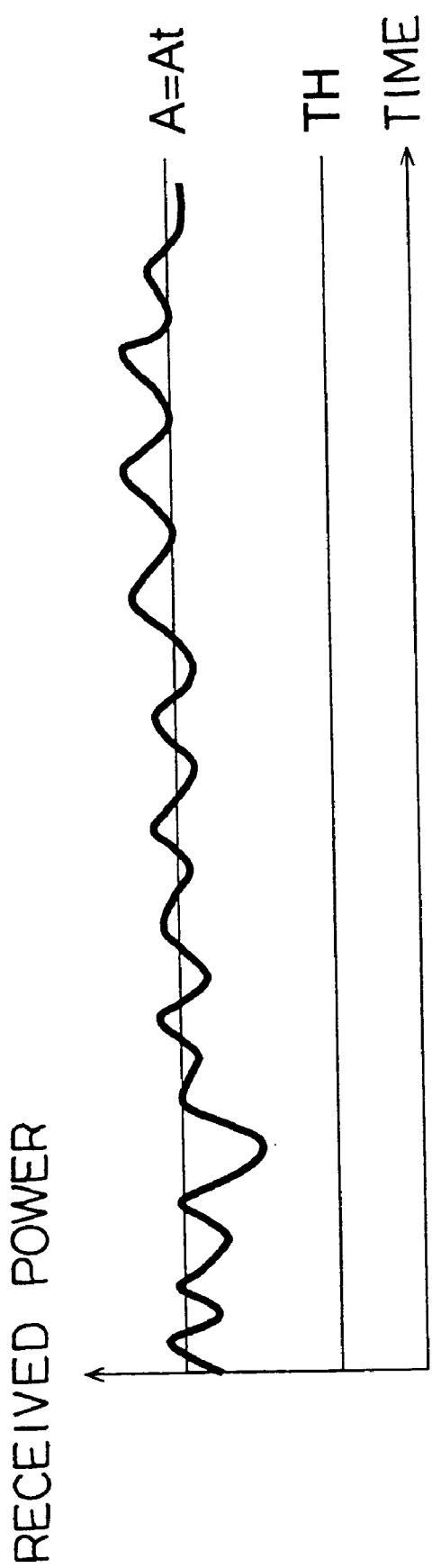
FIG. 15 is a relational diagram showing another example of relation between a level of reflected wave (received strength) and a threshold for detecting signals.

On the other hand, if the relation between the level of received strength and the threshold TH for detecting signals is as shown in FIG. 15, that is, the predetermined threshold TH is considerably low relative to the level of received strength, the predicted average A agrees with the true average At.

From the above, it is understood that there exists the following relation between the predicted average A and the true average At:

$$A \geq At$$

Therefore, in order to ensure that the predicted average A of received strength always accords with the true average At thereof, the predicted average A needs to be processed using a function a which takes values satisfying $0 \leq \alpha \leq 1$.

$$\alpha A = At$$

In the present invention, the detection probability (corresponding to the outputs P1, p2 from the probability calculation circuit 35) is used as the function α, the reason for which will be described hereunder.

In the case of a target producing a high detection probability, the received signal strength is not largely deviated from the true average, and an instantaneous value of the received signal strength has high reliability, both in itself and as an element used for calculating the probability voltage ratio, based on which the azimuth is judged. In the case of a target producing a low detection probability, the received signal strength has low reliability both in itself and as an element for calculating the probability voltage ratio.

At the time of accumulating the calculation of the probability, "0" is used as a supplementary value to the value undetected by the tracking part. This is the severest supplementary value since the received strength is always positive. Therefore, in the case of a target of which the received signal strength has low reliability, the predicted average is largely lowered, which brings such an effect as reducing an impact of a side lobe on the calculation of the probability voltage ratio which is performed by the operation part 39 for azimuth judgment. It is also possible in the second, fourth and fifth embodiments to supplement the undetected data as described above, thereby to reduce the influence of side lobes on azimuth judgment.

For example, a side lobe becomes a problem mainly when a side lobe of one beam appears at the same azimuth as a main lobe of another adjacent beam. At that time, if it is possible to emphasize the influence of the main lobe, the influence of the side lobe can be reduced.

Therefore, in the present invention, the predicted received strength is processed using the detection probability as a value relating to reliability, thereby to provide the predicted received strength with high reliability. Here, the detection probability strongly correlates to the received strength and serves to provide time-series-data with reliability. Specifically, both in order to obtain the average of the received strength and in order to obtain the detection probability, measurement needs to be performed a certain times, and the calculation of the average of the received strength and the calculation of the detection probability are each performed using time series data. When thus averaged received strength is processed using thus calculated detection probability to obtain the probability voltage ratio, it means to provide the averaged received strength with such reliability as required of data.

As is clear from the above, since the voltage ratio (strength ratio) of received signals is a function of the azimuth, and since the received strength (voltage) and the detection probability strongly correlate with each other, the probability voltage ratio which is obtained by processing the received strength with the detection probability is a function of the azimuth. Therefore, in the present embodiment, the calculated probability voltage ratio and the azimuth are related with each other, thereby to emphasize the main lobe.

The ratio/azimuth reference part 40 has ROM (not shown) in which the relation between the probability voltage ratio and the azimuth is mapped in advance. Using the probability voltage ratio obtained by the operation part 39 as an address, the ratio/azimuth reference part 40 reads the azimuth corresponding to that address out of the ROM, thereby to judge the azimuth.

Thus, in the present embodiment, the detection probability of an object by each beam and the received strength by each beam are obtained by tracking, and the probability voltage ratio is calculated using thus obtained data on the detection probability and the received strength. Using the calculated probability voltage ratio as an address, the ratio/azimuth reference part reads the azimuth of an object corresponding to that address, out of the look up table storing azimuths. Therefore, in the present embodiment, the measurement of the azimuth of an object can be performed with reliable structure relying on software, supplementing lack of data and reducing the influence of a side lobe, with high accuracy and in a wide range.

Next, a fourth embodiment which forms a radar device according to the third embodiment using the spread spectrum modulation technique will be explained referring to a block diagram shown in FIG. 16. It is to be noted that the same reference numbers are attached to elements similar to those in FIG. 13 to facilitate the explanation.

Figure 16:
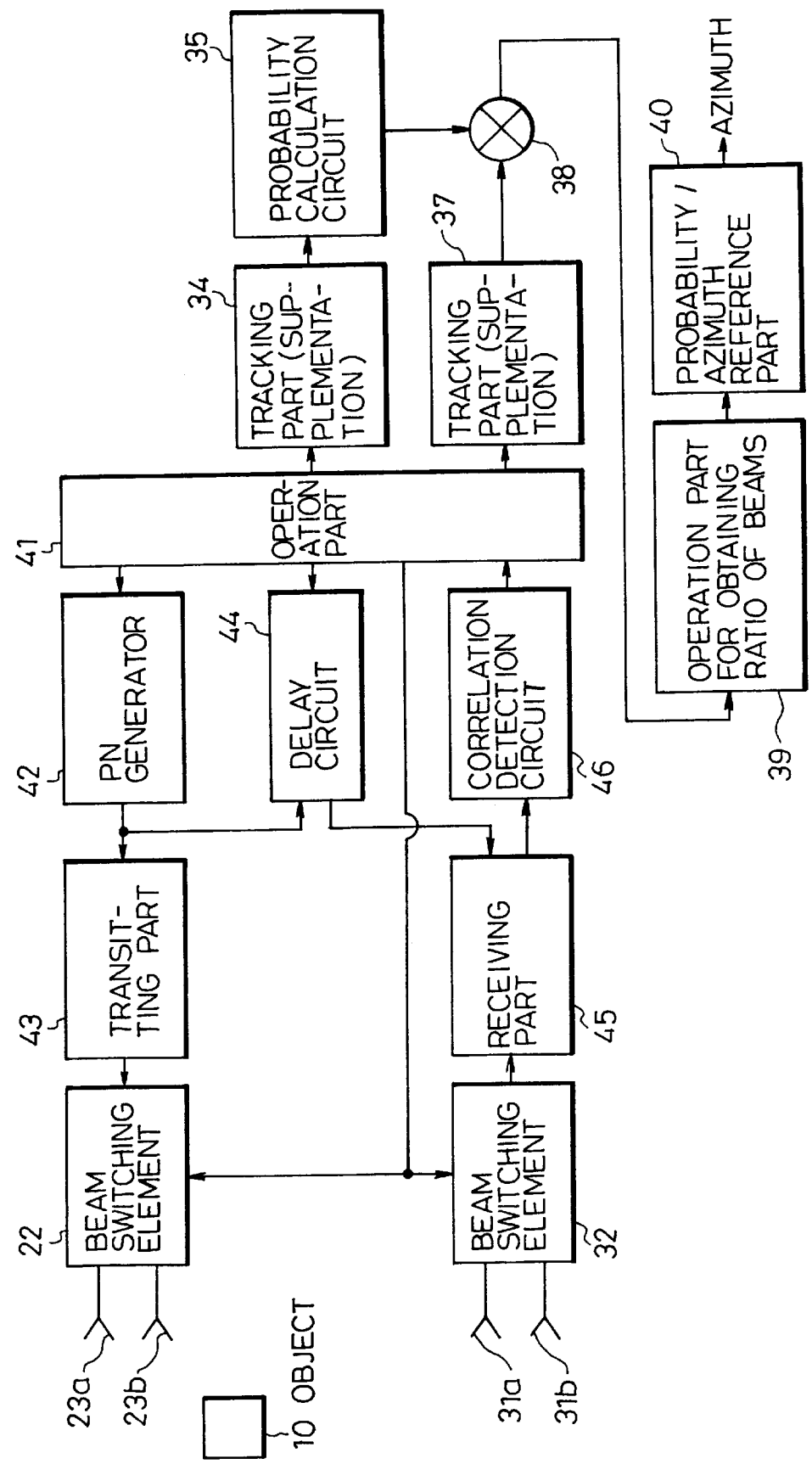
FIG. 16 is a block diagram showing a fourth embodiment in which a radar device according to a third embodiment is embodied utilizing the spread spectrum modulation technique.

As shown in FIG. 16, a radar device according to the fourth embodiment comprises an operation part 41, a PN generator 42, a transmitting part 43, a beam switching element 22, a transmitting antennas 23a, 23b, a delay circuit 44, receiving antennas 31a, 31b, a beam switching element 32, a receiving part 45, a correlation detection circuit 46, a tracking part 34 for supplementing data coming from the operation part 41, a probability calculation circuit 35, a tracking part 37 for supplementing data coming from the operation part 41, a multiplier 38, an operation part 39 and a ratio/azimuth reference part 40. In the present embodiment, the transmitting part 43 and the PN generator 42 form the signal generating circuit 21 shown in FIG. 13, and the operation part 41, the delay circuit 44, the receiving part 45 and the correlation detection circuit 46 form the distance and relative speed measurement part. The PN generator 42, the transmitting part 43, the delay circuit 44, the receiving part 45 and the correlation detection circuit 46 have the similar functions as those of the corresponding parts of the first embodiment shown in FIG. 1. The explanation of those parts will be therefore omitted.

The beam switching elements 22 and 32 perform the switching of the transmitting antennas 23a, 23b and the receiving antennas 31a, 31b under the operation control of the operation part 41.

The operation part 41 controls the output of a PN code from the delay circuit 44 to delay the output for a predetermined time, as the operation part in FIG. 1 does. The operation part 41 counts a slide width in which a correlation value relative to a received signal from each of the receiving antennas 31a and 31b exceeds a threshold S (see FIGS. 3A and 3B), and obtains the maximum value of each slide width.

The tracking part 37 chooses values relative to the same target from among the values measured by a plurality of antennas to relate those values with each other, accumulates such values relative to each target for a certain points of time, and calculates predictive values. The values measured by a plurality of antennas are related with each other, depending on degree of correlation between the measured values and the predicted values of distance and of relative speed. This applies to the case in which the values are renewed and newly related with each other. The multiplier 38 multiplies, for example, in the case in which there exists a single target, detection probability inputted from the probability calculation circuit 35 (detection probability p1, p2 by each beam) and data on the slide width inputted from the tracking part 37 (slide width H1, H2 by each beam), thereby to output the product of the slide width and the detection probability (hereunder referred to as "probability width") p1H1, P2H2. Based on the probability width, the operation part 39 calculates probability width ratio according to the following expression, and outputs the result of the calculation to the ratio/azimuth reference part 40.

Probability width ratio=(p1H1−p2H2)/(p1H1+p2H2)

The ratio/azimuth reference part 40 judges the azimuth of an object, referring to a look up table in which the probability width ratio and the azimuth are, in advance, related with each other. In the case in which there exist a plurality of targets, the azimuths of those targets can be judged in the same manner.

Thus, in the present embodiment, the slide width by each beam is processed using the detection probability, so that the influence of a side lobe is eliminated from the relation between the measured probability width and the azimuth, as shown in FIG. 17. When the probability width ratio is calculated based on those results of measurement, the relation between the azimuth and the probability width ratio is as shown in FIG. 18, showing an improvement in respect of one-to-one correspondence of the azimuth to the probability width ratio. This helps to judge an azimuth correctly.

In respect of the foregoing embodiments, an explanation has been given for the case in which two radar beams are used. The present invention is not, however, limited to that case. Three or more beams can be used. For example, in the case in which three beams are used, it is possible to calculate the following probability voltage (width) ratio R and judge the azimuth of an object, referring to a look up table in which such probability voltage (width) ratio and the azimuth are, in advance, related with each other, based on the beam pattern characteristics.

R=[probability voltage (width) by right beam WR−probability
    voltage (width) by left beam WL]/[probability voltage (width)
    by right beam WR+probability voltage (width) by center beam
    WC+probability voltage (width) by left beam WL]     (10)

Figure 19:
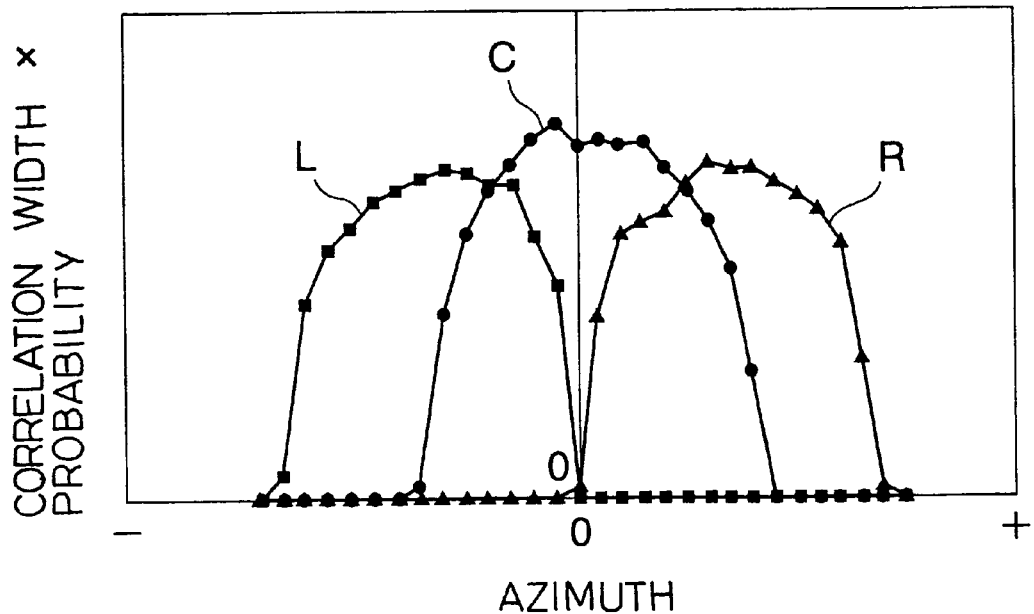
FIG. 19 a relational diagram showing relation between azimuth and probability width of three beams.
Figure 20:
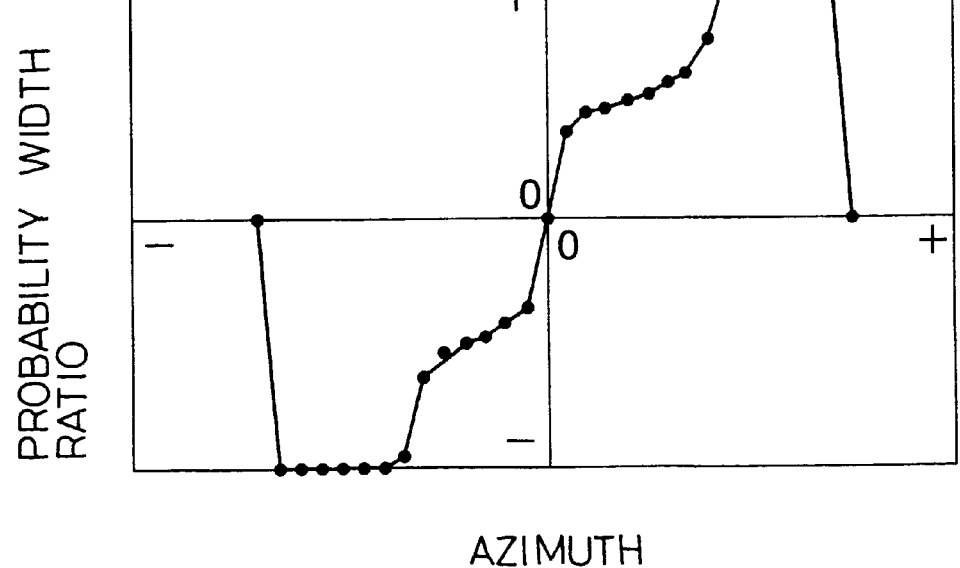
FIG. 20 is another relational diagram showing relation between azimuth and probability width ratio.

For example, in the case in which the probability width is used, the influence of a side lobe is eliminated from the relation between the measured probability width and the azimuth, as shown in FIG. 19. When the probability width ratio is calculated based on those results of measurement, the relation between the azimuth and the probability width ratio is as shown in FIG. 20, showing an improvement in respect of one-to-one correspondence of the azimuth to the probability width ratio. This helps to obtain an azimuth correctly.

In the case in which four or more beams are to be used, a plurality of above described radar devices using two or three beams may be used in combination. In this case, azimuth measurement of an object can be performed in a wider range.

In an actual beam pattern, there are side lobes as shown in FIG. 26. Therefore, in the case of a target which produces a large received strength such as a truck, the target may be detected not only by a main lobe of a beam (for example, a beam L) but also by a side lobe of another beam (for example, a beam R) which is not adjacent to the former beam but has a side lobe in the area of the main lobe of the former beam, which leads to an error in the azimuth measurement of a target.

Further, supposing that there exist a plurality of targets having different radar cross section at approximately the same distance at difference azimuths (in the areas of respective main lobes of beams R and L) in FIG. 26, a weak received signal from a target having a large radar cross section is amplified, but since a receiving amplifier reaches saturation at a certain value, difference between an strength by a main lobe and an strength by a side lobe becomes small. Thus, as in the foregoing case, a target having a small radar cross section may be detected also by a side lobe of another beam which is not adjacent to a beam with which the target should be detected but has a side lobe in the area of a main lobe of the latter beam, which leads to an error in the azimuth measurement of the target. Further, if data for a target are falsely integrated at the time of tracking, an azimuth of that target may not be able to be measured.

Considering the above, a fifth embodiment is so provided as to find a physical contradiction of measurement in strengths of received signals by adjacent beams, which can not occur in the measurement by a main lobe, and eliminate that contradiction of measurement, thereby to reduce the influence of a side lobe.

Figure 21:
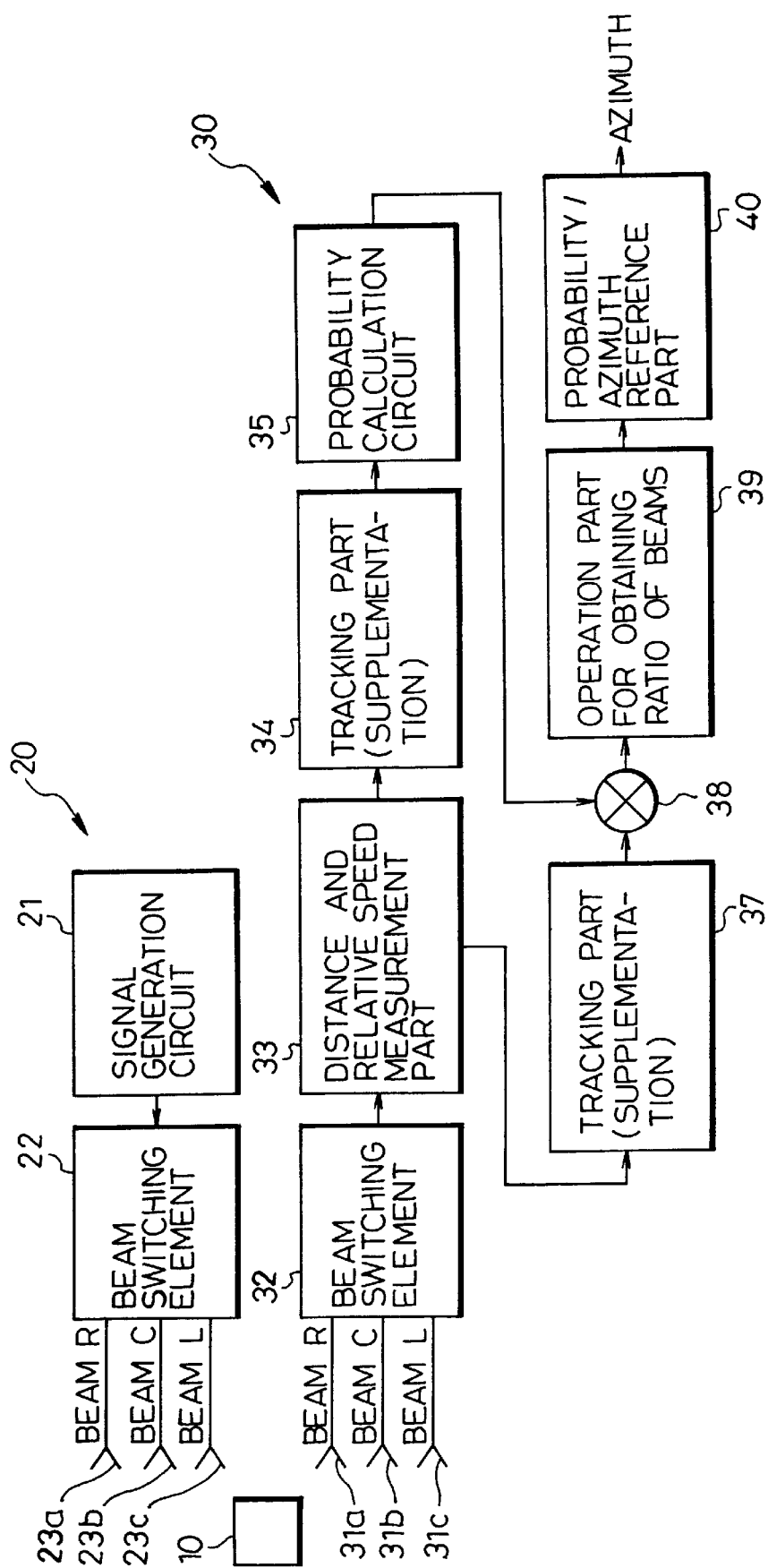
FIG. 21 is a block diagram showing formation of a fifth embodiment of a radar device according to the present invention.

FIG. 21 is a block diagram showing formation of the fifth embodiment of a radar device according to the present invention. As in the case of the third embodiment, the fifth embodiment can be formed using techniques for a tracking radar, the spread spectrum modulation technique and so forth.

A difference between the fifth and third embodiments is that the fifth embodiment arranges three transmitting antennas $23a\sim23c$ and three receiving antennas $31a\sim31c$ so as to transmit and receive right, center and left beams R, C and L. Another difference is that the algorithm for numerical substitution for calculating the probability voltage ratio performed by an operation part 39 of the fifth embodiment is improved to further reduce the influence of a side lobe.

As shown in FIG. 21, a multiplier 38 multiplies detection probabilities pR, pC, pL by the respective beams R, C, L outputted from a probability calculation circuit 35 and received strengths VR, VC, VL by the respective beams R, C,L and outputs the resulting probability voltages WR, WC, WL to the operation part 39.

Figure 22:
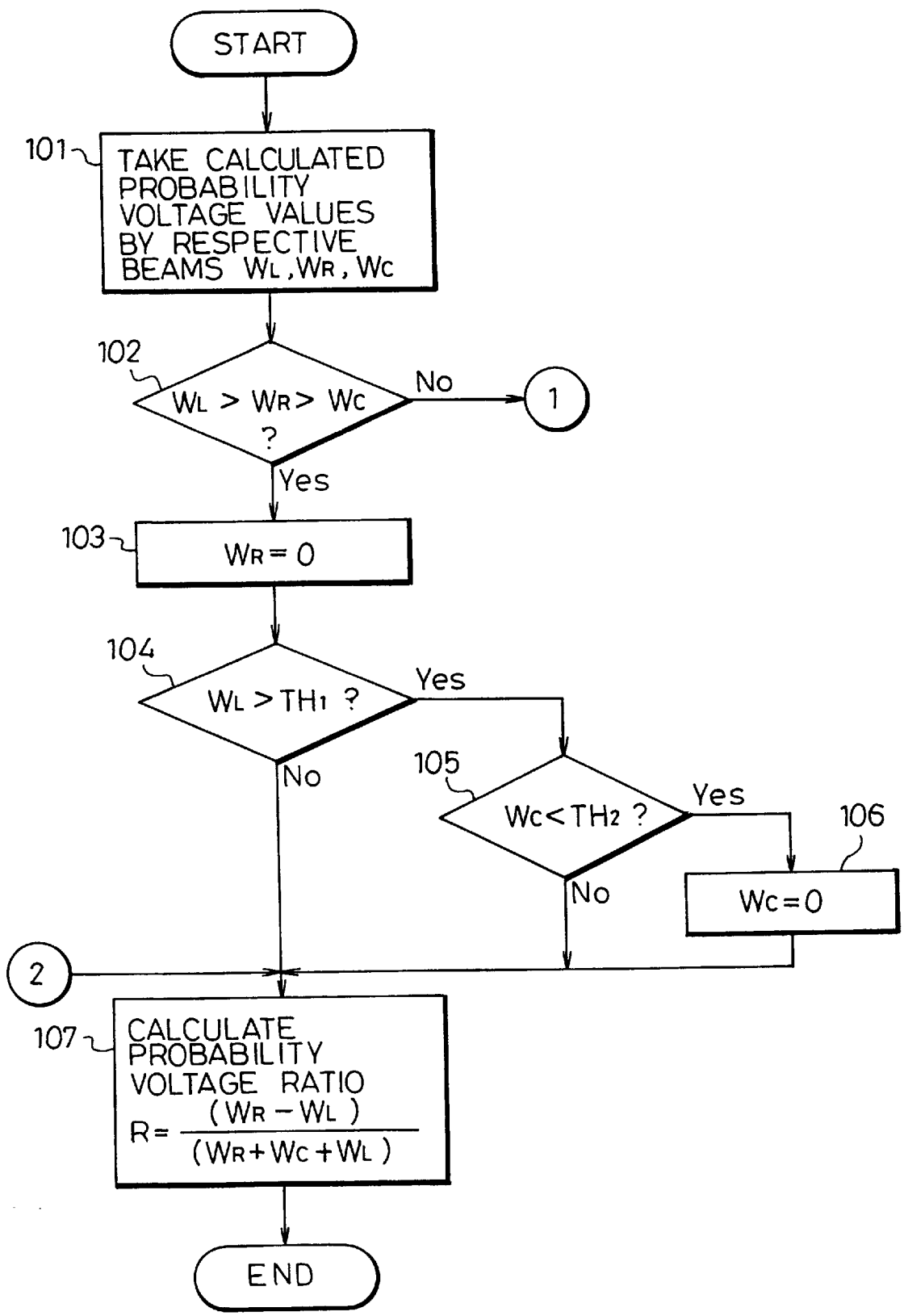
FIG. 22 is a part of flow chart for explaining algorithm for numerical substitution for calculating probability voltage ratio performed by an operation part shown in FIG. 21.
Figure 23:
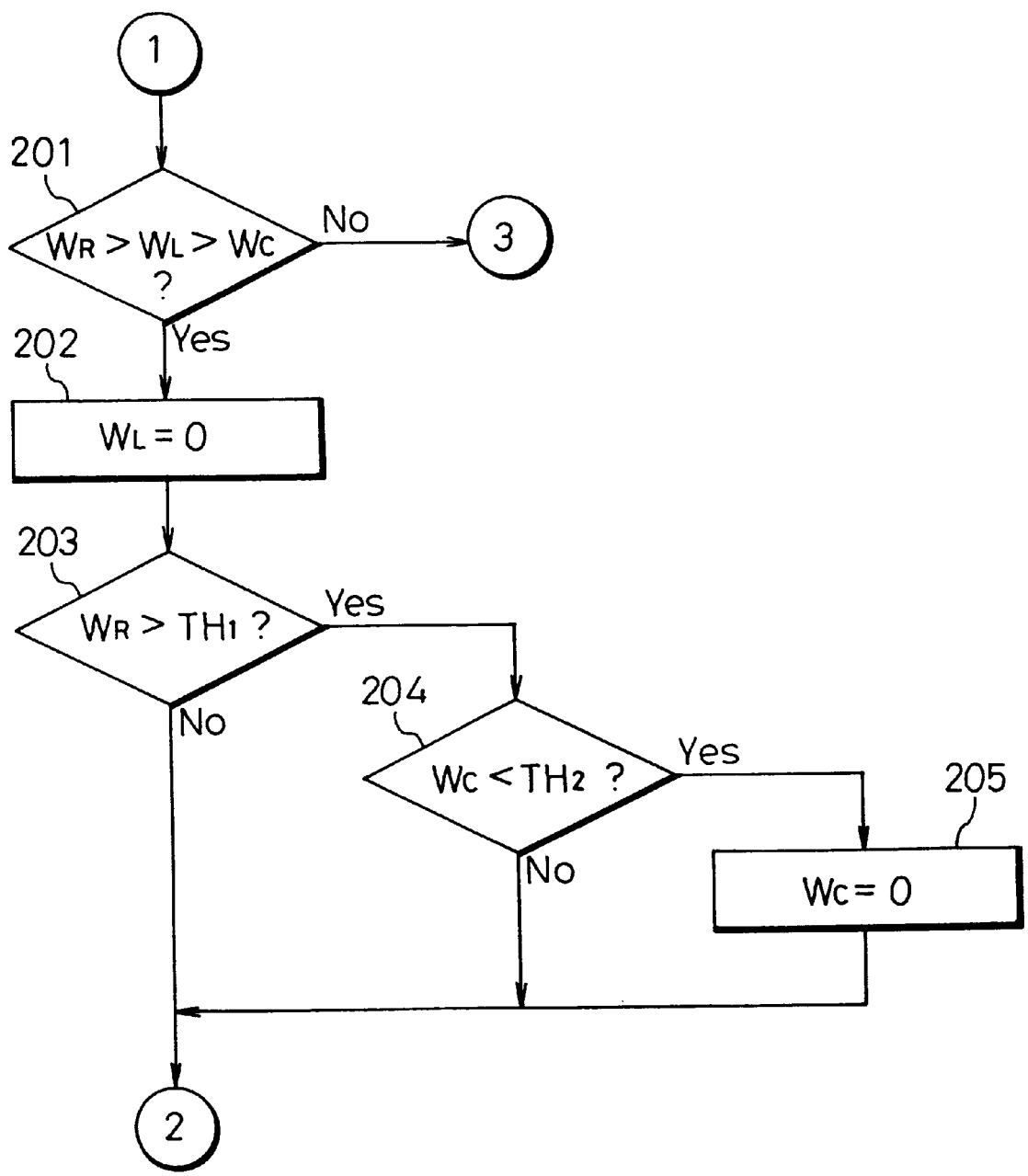
FIG. 23 is another part of flow chart for explaining the above mentioned algorithm.

The operation part 39 performs the algorithm for substituting a value (value of probability voltage) for calculating the probability voltage ratio according to the expression (10) R=(WR−WL)/(WR+WC+WL), which is shown as a flow-chart in FIGS. 22~24. In the fifth embodiment, thresholds TH1 and TH2 for probability voltage are determined, based on which whether respective probability voltages are produced by a main lobe or a side lobe is Judged. More specifically, the thresholds TH1 and TH2 are provided to judge whether respective probability voltages are produced by a main lobe or a side lobe when the receiving amplifier is in a saturated state. The threshold TH2 is a value which the probability voltage produced by a side lobe in a saturated state of the amplifier can not exceed, and which shows the relation TH1>TH2.

First, as shown in FIG. 22, the operation part 39 takes the probability voltages WR, WC, WL by the respective beams from the multiplier 38 (Step 101) and Judges whether those probability voltages show the relation WL>WR>WC (Step 102).

If the probability voltages do not show the relation WL>WR>WC, the algorithm proceeds to a step shown in FIG. 23. If the probability voltages show the relation WL>WR>WC, that means a physical contradiction of measurement, so that the probability voltage WR is judged to be produced by a side lobe or to be due to false integration of data, and a value "0" is substituted for WR in the expression (10) (Step 103). Then, whether the probability voltage WL by the left beam is produced by a main lobe and the result of proper integration or not is judged, depending upon whether the WL shows the relation WL>TH1 (Step 104).

If the probability voltage WL shows the relation WL>TH1, then whether the probability voltage WC by the center beam is produced by a side lobe or not is judged, depending upon whether the WC shows the relation WC<TH2 (Step 105). If the probability voltage WL does not show the relation WL>TH1, it is judged that the receiving amplifier does not reach the saturation yet. Then, the operation part 39 substitutes the values of probability voltage WR, WC and WL by the respective beams into the expression (10), thereby to calculate the probability voltage ratio R (Step 107 in FIG. 22), and outputs the result of the calculation to the ratio/azimuth reference part 40. Thus, the influence of a side lobe of each beam can be nullified as in the case of the third embodiment.

At Step 105, if the probability voltage WC does not show the relation WC<TH2, the algorithm proceeds to the above mentioned Step 107. If the probability voltage WC satisfies the relation WC<TH2, the probability voltage WC is judged to be influenced by a side lobe, a value "0" is substituted for WC (Step 106), and the algorithm proceeds to the above mentioned Step 107 (in FIG. 22).

Thus, in the present embodiment, when the probability voltage WL is produced by a main lobe in a saturated state of the receiving amplifier and the probability voltage WR or WC is due to the influence of a side lobe, the operation part 39 substitutes a value of probability voltage by the left beam L for WL and "0" for WR or WC in the expression (10), thereby to calculate the probability voltage ratio R, and outputs the result of the calculation to the ratio/azimuth reference part 40.

Next, the case in which the probability voltages do not show the relation WL>WR>WC at Step 102 will be explained referring to FIG. 23. As shown in FIG. 23, if there is not a contradiction of measurement which shows itself in the relation between the respective probability voltages not satisfying WL>WR>WC, whether the probability voltages show the relation WR>WC>WL or not is judged (Step 201).

If the probability voltages do not show the relation WR>WC>WL, the algorithm proceeds to a step in FIG. 24. If the probability voltages show the relation WR>WC>WL, that means a physical contradiction of measurement, so that the probability voltage WL is judged to be produced by a side lobe, and a value "0" is substituted for WL in the expression (10) (Step 202). Then, whether the probability voltage WR by the right beam is produced by a main lobe or not is judged, depending upon whether the WR shows the relation WR>TH1 (Step 203).

If the probability voltage WR shows the relation WR>TH1, then whether the probability voltage WC by the center beam is produced by a side lobe or not is judged, depending upon whether the WC shows the relation WC<TH2 (Step 204). If the probability voltage WR does not show the relation WR>TH1, it is judged that the receiving amplifier does not reach the saturation yet. Then, the operation part 39 substitutes the values of probability voltage WR, WC by the respective beams into the expression (10), thereby to calculate the probability voltage ratio R (Step 107 in FIG. 22), and outputs the result of the calculation to the ratio/azimuth reference part 40.

At Step 204, if the probability voltage WC shows the relation WC<TH2, that probability voltage WC is judged to be influenced by a side lobe, so that a value "0" is substituted for WC (Step 205), and the algorithm proceeds to the above mentioned Step 107 (in FIG. 22).

Thus, in the present embodiment, when the probability voltage WR is produced by a main lobe in a saturated state of the receiving amplifier and the probability voltage WL or WC is due to the influence of a side lobe, the operation part 39 substitutes a value of probability voltage by the right beam R for WR and "0" for WL or WC in the expression (10), thereby to calculate the probability voltage ratio R, and outputs the result of the calculation to the ratio/azimuth reference part 40.

Next, the case in which the probability voltages do not show the relation WR>WC>WL at Step 201 will be explained referring to FIG. 24. As shown in FIG. 24, if there is not a contradiction of measurement which shows itself in the relation between the respective probability voltages not satisfying WR>WC>WL, whether the probability voltage WL shows the relation WL>TH1 or not is judged (Step 301).

If the probability voltage WL does not show the relation WL>TH1, then whether the probability voltage WR shows the relation WR>TH1 or not is judged (Step 302). If the probability voltage WL shows the relation WL>TH1, then whether the probability voltage WR is produced by a side lobe or not is judged, depending upon whether the WR shows the relation WR<TH2 (Step 303).

If the probability voltage WR does not show the relation WR<TH2, then whether the probability voltage WC shows the relation WC<TH2 or not is judged (Step 305). If the probability voltage WC shows the relation WR<TH2, then a value "0" is substituted for WR (Step 304) and the algorithm proceeds to Step 305.

At Step 305, if the probability voltage WC does not show the relation WC<TH2, the algorithm proceeds to the above mentioned Step 107 (in FIG. 22). If the probability voltage WC shows the relation WC<TH2, the probability voltage WC is judged to be influenced by a side lobe, so that a value "0" is substituted for WC in the expression (Step 306) and the algorithm proceeds to the above mentioned Step 107.

Thus, in the present embodiment, when the probability voltage WL is produced by a main lobe in a saturated state of the receiving amplifier and the probability voltage WR or WC is due to the influence of a side lobe, the operation part 39 substitutes a value of probability voltage by the left beam L for WL and "0" for WR or WC in the expression (10), thereby to calculate the probability voltage ratio R, and outputs the result of the calculation to the ratio/azimuth reference part 40.

Next, if the probability voltage WR does not show the relation WR>TH1 at Step 302, then whether the probability voltage WC shows the relation WC>TH1 or not is judged (Step 307). If the probability voltage WR shows the relation WR>TH1, then whether the probability voltage WL is produced by a side lobe or not is judged, depending upon whether the WL shows the relation WL<TH2 (Step 308).

If the probability voltage WL does not show the relation WL<TH2, then whether the probability voltage WC is produced by a side lobe or not is judged, depending upon whether the WC shows the relation WC<TH2 (Step 310). If the probability voltage WL shows the relation WL<TH2, then a value "0" is substituted for WL (Step 309) and the algorithm proceeds to Step 310.

At Step 310, if the probability voltage WC does not show the relation WC<TH2, the algorithm proceeds to the above mentioned Step 107 (in FIG. 22). If the probability voltage WC shows the relation WC<TH2, a value "0" is substituted for WC (Step 311) and the algorithm proceeds to the above mentioned Step 107.

Thus, in the present embodiment, when the probability voltage WR is produced by a main lobe in a saturated state of the receiving amplifier and the probability voltage WL or WC is due to the influence of a side lobe, the operation part 39 substitutes a value of probability voltage by the right beam R for WR and "0" for WL or WC in the expression (10), thereby to calculate the probability voltage ratio R, and outputs the result of the calculation to the ratio/azimuth reference part 40.

Next, if the probability voltage WC does not show the relation WC>TH1 at Step 307, the respective probability voltages are judged to be produced by main lobes, the operation part 39 substitutes respective values of probability voltage by the beams L, R and C for WL, WR and WC in the expression (10), thereby to calculate the probability voltage ratio R, and outputs the result of the calculation to the ratio/azimuth relating part 40.

If the probability voltage WC shows the relation WC>TH1, then whether the probability voltage WL is produced by a side lobe or not is judged, depending upon whether the WL shows the relation WL<TH2 (Step 312). If the probability voltage WL does not show the relation WL<TH2, then whether the probability voltage WR shows the relation WR<TH2 or not is judged (Step 314). If the probability voltage WL shows the relation WL<TH2, then a value "0" is substituted for WL (Step 313) and the algorithm proceeds to Step 314.

At Step 314, if the probability voltage WR does not show the relation WR<TH2, the algorithm proceeds to the above mentioned Step 107 (in FIG. 22). If the probability voltage WR shows the relation WR<TH2, a value "0" is substituted for WC (Step the algorithm proceeds to the above mentioned Step 107.

Thus, in the present embodiment, when the probability voltage WC is produced by a main lobe in a saturated state of the receiving amplifier and the probability voltage WL or WR is due to the influence of a side lobe, the operation part 39 substitutes a value of probability voltage by the center beam C for WC and "0" into WL or WR in the expression (10), thereby to calculate the probability voltage ratio R, and outputs the result of the calculation to the ratio/azimuth reference part 40.

Based on thus obtained probability voltage ratio, the ratio/azimuth reference part 40 judges an azimuth of an object referring to a look up table in which the probability voltage ratio and the azimuth are, in advance, related with each other, based on the beam pattern characteristics.

Thus, when there exists a target producing a large received strength, when there happens false integration of data concerning a plurality of vehicles, or when the receiving amplifier is in a saturated state, the present embodiment eliminates a physical contradiction of measurement which is supposed with a high probability to be caused by detection by a side lobe and a contradiction due to false integration, from calculation of a probability voltage ratio. Then, using the calculated probability voltage ratio as an address, a look up table storing azimuths based on the beam pattern characteristics is searched to obtain a corresponding azimuth of an object. Therefore, the present embodiment can perform an azimuth detection of an object, further reducing the influence of a side lobe.

Needless to say, the present embodiment may use three or more beams and/or be applied to a radar device formed using the spread spectrum modulation technique (FIG. 16), as in the case of the third embodiment.

The present invention is not limited to the foregoing embodiments. For example, omitting the calculation of the probability as described in respect of the embodiments 3 through 5, an strength ratio (voltage ratio) may be calculated only using received strengths by respective beams which are provided from the tracking part 37, so that an azimuth of an object 10 may be obtained by relating the strength ratio to the azimuth. In this case, though precision of azimuth measurement is lowered to some degree, elements such as the tracking part 34, the probability calculation circuit 35 and the multiplier 38 are not needed, so that the device has simpler structure and the manufacturing cost can be reduced.

The present invention is not limited to the foregoing embodiments. For one transmitting antenna, a plurality of receiving antenna may be provided. For example, supposing that three receiving antennas are provided to cover an azimuth measurement range of 9°, if a transmitting antenna having a half power beamwidth of 10° or so is provided, an object existing in that azimuth measurement range can be detected by those receiving antennas. In this case, only one transmitting antenna is needed, so that the manufacturing cost can be reduced and space required for installation of the radar device can be reduced.

We claim:

1. A radar device which transmits an electric wave, receives a reflected wave of said electric wave from an object, and thereby detects said object, said radar device comprising:

a plurality of antennas each having an antenna beam pattern having a predetermined directivity, said antennas being arranged such that the antenna beam patterns of said antennas are adjacent to each other, and the antenna beam patterns are partly overlapping with each other, frequency measurement means for measuring a frequency of how often said object is detected by each of said antennas, and azimuth measurement means for obtaining an azimuth of said detected object, based on (i) said measured frequency for each of said antennas and (ii) beam pattern characteristics of each of said antennas.

2. A radar device according to claim 1, wherein said azimuth measurement means calculates a detection probability of said object based on said measured frequency, obtains in advance a relation between detection probability and azimuth based on said beam pattern characteristics of said antennas, and obtains an azimuth of said object based on said calculated detection probability and said relation between detection probability and azimuth.

3. A radar device which transmits an electric wave, receives a reflected wave of said electric wave from an object, and thereby detects said object, said radar device comprising:

a plurality of antennas each having an antenna beam pattern having a predetermined directivity, said antennas being arranged such that the antenna beam patterns of said antennas are adjacent to each other, and the antenna beam patterns are partly overlapping with each other, frequency measurement means for measuring a frequency of how often said object is detected by each of said antennas, signal strength measurement means for measuring a strength of a received signal from said object, received by each of said antennas, and azimuth measurement means for obtaining an azimuth of said detected object, based on (i) said measured frequency for each of said antennas, (ii) said measured signal strength and (iii) beam pattern characteristics of each of said antennas.

4. A radar device according to claim 3, wherein said azimuth measurement means calculates a detection probability based on said measured frequency, calculates a probability strength ratio of beams based on said calculated detection probability and said measured signal strength, obtains in advance a relation between signal strength ratio and azimuth based on beam pattern characteristics of said antennas, and obtains an azimuth of said object based on said calculated probability signal strength ratio and said relation between the signal strength ratio and azimuth.

5. A radar device according to claim 3, wherein said radar device further comprises tracking means for tracking an object, said plurality of antennas comprise at least three antennas, and said azimuth measurement means stores in, advance a conversion function for obtaining a corresponding azimuth from a signal strength ratio of adjacent beams, calculates a detection probability based on said measured frequency, obtains a probability signal strength based on said calculated detection probability and said measured signal strength, compares values of probability signal strength of the respective beams with each other, thereby to judge whether said object is detected by a side lobe of each beam or detected by a main lobe of each beam or detected due to false tracking by said tracking means, calculates a probability signal strength ratio of beams based on such values of probability signal strength of received signals that are judged to be detected by main lobes of beams, and obtains an azimuth of said object utilizing said stored conversion function based on said calculated probability signal strength ratio.

6. A radar device according to claim 5, said azimuth measurement means judges whether said object is detected by a side lobe of each beam or detected by a main lobe of each beam or detected due to false tracking by said tracking means, by judging whether values of probability signal strength of received signals by adjacent beams show a physical contradiction of measurement which can not occur in measurement by a main lobe, and when a value of probability signal strength shows a contradiction, said azimuth measurement means judges that said value is detected by a side lobe and eliminates said value from calculation for obtaining said probability signal strength ratio, and when values of probability signal strength do not show a contradiction, said azimuth measurement means judges whether values of strength of said received signals are saturated or not, and eliminates a value of probability strength of a received signal whose value of strength is not judged to be saturated, from calculation for obtaining said probability signal strength ratio.

7. A radar device according to claim 6, wherein said azimuth measurement means judges that there is a physical contradiction of measurement, when both beams which are adjacent to a reference beam on both sides show a value of probability signal strength greater than the value of probability signal strength of said reference beam.

8. A radar device according to claim 3, wherein said radar device transmits an electric wave whose band is spread by a PN code, receives a reflected wave of said electric wave from an object, detects a correlation between a received signal and said PN code which is delayed, and thereby detects said object, said signal strength measurement means detects such a range of delay time of said PN code that a detected value of said correlation exceeds a predetermined threshold, and said azimuth measurement means calculates a detection probability based on said measured frequency, calculates a probability signal strength ratio of beams based on said calculated detection probability and said measured signal strength, obtains in advance a relation between signal strength ratio and azimuth based on beam pattern characteristics of said antennas, and obtains an azimuth of said object based on said calculated probability signal strength ratio and said relation between signal strength ratio and azimuth.

9. A radar device according to claim 3, wherein said radar device transmits an electric wave whose band is spread by a PN code, receives a reflected wave of said electric wave from an object, detects a correlation between a received signal and said PN code which is delayed, and thereby detects said object, and said signal strength measurement means detects such a range of delay time of said PN code that a value of said detected correlation exceeds a predetermined threshold.

10. A radar device which transmits an electric wave, receives a reflected wave of said electric wave from an object, and thereby detects said object, said radar device comprising:

a plurality of antennas each having an antenna beam pattern having a predetermined directivity, said antennas being arranged such that the antenna beam patterns of said antennas are adjacent to each other, and the antenna beam patterns are partly overlapping with each other, frequency measurement means for measuring a frequency of how often said object is detected by each of said antennas, signal strength measurement means for measuring a strength of a received signal from said object, received by each of said antennas, and azimuth measurement means for obtaining an azimuth of said detected object, based on (i) said measured frequency for each of said antennas, (ii) said measured signal strength and (iii) beam pattern characteristics of each of said antennas, and tracking means for tracking an object, wherein said plurality of antennas comprise at least three antennas, and said azimuth measurement means stores in advance a conversion function for obtaining a corresponding azimuth from a signal strength ratio of adjacent beams, compares measured values of signal strength of the respective beams with each other, thereby to judge whether said object is detected by a side lobe of each beam or detected by a main lobe of each beam or detected due to false tracking by said tracking means, calculates a signal strength ratio of beams based on such values of strength of received signals that are judged to be detected by main lobes of beams, and obtains an azimuth of said object utilizing said stored conversion function based on said calculated signal strength ratio.

11. A radar device according to claim 10, wherein:

said azimuth measurement means judges whether said object is detected by a side lobe of each beam or detected by a main lobe of each beam or detected due to false tracking by said tracking means, by judging whether values of strength of received signals of adjacent beams show a physical contradiction of measurement which can not occur in measurement by a main lobe, and when a value of signal strength shows a contradiction, said azimuth measurement means judges that said value is detected by a side lobe and eliminates said value from calculation for obtaining said signal strength ratio, and when values of signal strength do not show a contradiction, and said azimuth measurement means judges whether values of strength of said received signals are saturated or not, and eliminates a value of strength of a received signal which is not judged to be saturated, from a calculation for obtaining said signal strength ratio.

12. A radar device according to claim 11, wherein said azimuth measurement means judges that there is a physical contradiction of measurement, when both beams which are adjacent to a reference beam on both sides show a value of signal strength greater than the value of signal strength of said reference beam.

* * * * *